(12) United States Patent
Irving et al.

(10) Patent No.: US 6,455,210 B1
(45) Date of Patent: Sep. 24, 2002

(54) AQUEOUS THERMALLY BEACHABLE COMPOSITION USEFUL IN A PHOTOTHERMOGRAPHIC ELEMENT

(75) Inventors: Mark E. Irving, Penfield; Ramanuj Goswami, Webster; Kenneth N. Kilminster, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/731,373

(22) Filed: Dec. 6, 2000

(51) Int. Cl.$^7$ .................... G03C 1/498; G03C 1/83; G03C 7/02; G03C 7/407
(52) U.S. Cl. ............. 430/21; 430/352; 430/353; 430/339; 430/343; 430/517; 430/519; 430/507; 430/522; 430/964
(58) Field of Search ................... 430/517, 522, 430/519, 343, 339, 21, 352, 353, 964, 507

(56) References Cited

U.S. PATENT DOCUMENTS

| | | | |
|---|---|---|---|
| 4,196,002 A | 4/1980 | Levinson et al. | 430/617 |
| 4,201,590 A | 5/1980 | Levinson et al. | 430/617 |
| 4,962,009 A | * 10/1990 | Washizu et al. | 430/138 |
| 5,652,091 A | 7/1997 | Perry et al. | 430/517 |
| 5,693,589 A | 12/1997 | Goswami et al. | 430/339 |
| 5,705,323 A | 1/1998 | Perry et al. | 430/517 |

FOREIGN PATENT DOCUMENTS

GB  2004380  3/1979

* cited by examiner

Primary Examiner—Richard L. Schilling

(57) ABSTRACT

This invention relates to a photothermographic element comprising a support, at least one photothermographic image-receiving layer, and at least one antihalation layer or a filter layer, wherein the antihalation or filer layer comprises an aqueous heat-bleachable composition comprising at least one dye and at least one hexaarylbiimidazole in the form of particles dispersed in a matrix comprising a hydrophilic or aqueous dispersible polymer.

41 Claims, No Drawings

AQUEOUS THERMALLY BEACHABLE COMPOSITION USEFUL IN A PHOTOTHERMOGRAPHIC ELEMENT

FIELD OF THE INVENTION

This invention relates to colored, aqueous heat-bleachable compositions that can undergo a change in electromagnetic absorption characteristics upon application of heat. These compositions are useful as antihalation or filter components of photothermographic elements.

BACKGROUND OF THE INVENTION

Photographic materials usually contain various layers and components, including antihalation or filter layers, overcoats and radiation sensitive layers. The antihalation layer of an imaging element helps to prevent light that has passed through the radiation sensitive layer(s) from reflecting back into those layers. If reflection is not prevented, the resulting image is less sharp. In wet processes, the antihalation layer is generally removed or rendered colorless during wet-chemical processing. A filter layer is used to absorb light of a color not completely absorbed by a color layer or color layer unit above the filter layer, while transmitting light of a color intended to be absorbed by a color layer or a color layer below the filter layer. In other words, a filter layer is used to selectively absorb light not used for image capture. An antihalation layer can be viewed as a type of filter layer positioned below all the color layers, wherein no light needs to be transmitted to any color layer below the antihalation layer, but reflection of light back through the antihalation unit is prevented or minimized. Both an antihalation layer and a filter layer will typically employ a filter dye which absorbs, or filters out, light not intended to be absorbed by a color layer.

Imaging elements that can be processed, after imagewise exposure, simply by heating the element are referred to as photothermographic elements. It is often desired that such elements include an antihalation or filter layer. In most cases, the antihalation layer must be rendered substantially transparent upon heat processing in order to avoid unwanted absorption of light during scanning, which would undesirably result in a higher level of minimum density (an increased "$D_{min}$"). Particularly in the case of a color film, bleaching to transparency and avoiding or minimizing any tint is desirable.

A variety of antihalation compositions have been reported in the literature for use in photothermographic systems which avoid the use of processing solutions. Such compositions generally include heat bleachable antihalation dyes or incorporated addenda that act as bleaching agents. In particular, the use of radicals from biimidazoles as bleaching agents in antihalation compositions are known, being described, for example, in U.S. Pat. No. 4,196,002 (Levinson et al) and U.S. Pat. No. 4,201,590 (Levinson et al). The compositions contain filter dyes in reactive association with certain hexaarylbiimidazole (HABI) compounds. These antihalation compositions become colorless upon exposure to heat for a given time. Other patents that disclose similar antihalation compositions and photothermographic elements are: U.S. Pat. No. 5,652,091 (Perry et al.) U.S. No. Pat. 5,693,589 (Goswami et al.) and U.S. Pat. No. 5,705,323 (Perry et al.) and British patent GB 2,004,380 (Levinson et al.).

Most of the bleachable antihalation compositions in the prior art were designed for solvent systems in which the dyes and the bleaching agents were soluble as individual molecules. Since HABIs disclosed in the prior art have not been designed for use in aqueous systems, it is not predictable whether such systems would function when aqueous coated or in a hydrophilic layer comprising water. Furthermore, most of the bleachable antihalation compositions in the prior art have been directed to health imaging or graphic arts, as compared to photothermographic color film for consumer use. In the latter context, the dark keeping of a thermally bleachable dye composition would be a challenge. For such compositions to be useful, it would be crucial that they have the least amount of dark keeping loss, and at the same time undergo almost complete bleaching at higher temperatures.

There is a need for antihalation compositions that can be permanently and quickly bleached at lower temperatures in aqueous systems. Particularly in the field of color photothermographic film for consumer use, the requirements in terms of bleaching and keeping are high. Bleaching of an antihalation layer or filter layer is desired to improve scanning of the film.

SUMMARY OF THE INVENTION

The present invention relates to a photothermographic element comprising a support, at least one photothermographic layer, and at least one antihalation layer or a filter layer, wherein the antihalation or filer layer comprises a heat-bleachable composition comprising at least one light-absorbing filter dye (not derived from a latent image) and at least one hexaarylbiimidazole compound dispersed within the layer in the form of solid or liquid particles. The filter dye encompasses dyes used in filter layers or antihalation layers and excludes dyes resulting from developing agents or coupling agents. In one embodiment of the invention, the particles are dispersed in a matrix comprising a hydrophilic polymer or water-dispersible hydrophobic polymer. In one embodiment, the hydrophilic polymer is oxidized gelatin, as a binder for the antihalation or filter layer.

The present invention is also directed to a composition in the form of an aqueous dispersion comprising at least one antihalation or filter dye and at least one hexaarylbiimidazole compound, which aqueous dispersion comprises an aqueous phase and a dispersed organic phase, the aqueous phase comprising a soluble hydrophilic polymer or dispersed hydrophobic polymer and the dispersed organic phase comprising solid or liquid particles comprising said hexaarylbiimidazole compound, and wherein the hexaarylbiimidazole compound in said particles is capable of bleaching said dye when the dispersion is coated, dried and heated to a temperature of at least 90° C. for at least 0.5 seconds. The dye may be in the aqueous phase or in a separate dispersed organic phase. In one embodiment, solid particles comprising said hexaarylbiimidazole compound are employed. In another embodiment, an oil-in-water emulsion is employed.

The invention is also directed to a method of making a photothermographic element and the use of the photothermographic element, wherein the antihalation or filter layer becomes at least 40%, preferably at least 50%, more preferably at least 90%, colorless within about 20 minutes, preferably within about 5 minutes, more preferably within about 0.5 minutes, upon heating to a temperature of at least about 90° C. (according to controlled tests of such a layer essentially alone on the same support used in the product). The described antihalation or filter layer is especially advantageous because of the speed with which the layer becomes at least 40% colorless upon heating and its good shelf life storage stability. The invention is also directed to a method of forming an image in the multicolor photothermographic element, including scanning the developed image.

DETAILED DESCRIPTION OF THE INVENTION

As indicated above, a feature of the invention is the use, in a photothermographic element of a filter or antihalation layer comprising particles comprising a hexaarylbiimidazole compound dispersed in an aqueous matrix or an aqueous coated matrix. This hexaarylbiimidazole is used, in reactive association with a dye, to bleach the dye after image capture and upon suitable heating of the photothermographic element, advantageously during development of the image. A variety of hexaarylbiimidazole compounds are useful in an antihalation or filter layer according to the invention. These hexaarylbiimidazole compounds, also referred to as oxidative dimers of triarylimidazoles, are known compounds and can be prepared by methods known in the art. For instance, hexaarylbiimidazoles can be prepared by means of an interfacial oxidation of the parent triarylimidazole using potassium ferricyanide as an oxidant. For example, typical hexaarylbiimidazole compounds that are useful according to the invention are described in, and can be selected from, the following patents: U.S. Pat. No. 3,734,733 of Poot et al, issued May 22, 1973; U.S. Pat. No. 3,390,997 of Read, issued Jul. 2, 1968; U.S. Pat. No. 3,383,212 of MacLachlan, issued May 14, 1968; U.S. Pat. No. 3,445,234 of Cescon et al, issued May 20, 1969; U.S. Pat. No. 3,395,018 of Read, issued Jul. 30, 1968; U.S. Pat. No. 3,390,994 of Cescon et al, issued Jul. 2, 1968; U.S. Pat. No. 3,615,481 of Looney, issued Oct. 26, 1971; U.S. Pat. No. 3,666,466 of Strilko, issued May 30, 1972; U.S. Pat. No. 3,630,736 of Cescon, issued Dec. 28, 1971; and U.S. Pat. No. 3,533,797 of James et al, issued Oct. 13, 1970. These patents are incorporated herein by reference.

Typical examples of useful hexaarylbiimidazole compounds include oxidative dimers of 2,4,5-triarylimidazoles in which the aryl groups are substituted or unsubstituted. The hexaarylbiimidazole is preferably a dimer of two triarylimidazoles independently represented by the following Structure I below:

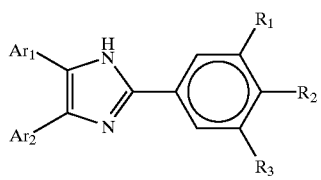

I

In the case, where the dimer is composed of identical monomers, the hexaarylbiimidazole can be represented as follows:

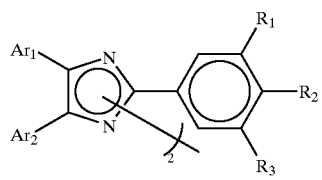

IA wherein $R_1$, $R_2$ and $R_3$ are independently substituents, for example, hydrogen, halogen, alkyl or substituted alkyl of 1 to about 10 carbons, alkoxy of 1 to 10 carbon atoms, aryl or substituted aryl of from 5 to about 10 carbons, cyano, carboalkoxy, nitro, a substituted or unsubstituted benzyl of from 6 to 11 carbon atoms; wherein $Ar_1$ and $Ar_2$ are independently substituted or unsubstituted carbocyclic or heterocyclic aromatic groups. Preferably, the alkyl or alkoxy substituents contain 1 to 4 carbon atoms, such as methyl, ethyl, propyl and butyl. Preferably, $R_1$, $R_2$ and $R_3$ in Structure I are independently hydrogen, halogen, alkyl or substituted alkyl of 1 to about 10 carbons, aryl or substituted aryl of from 5 to about 10 carbons, a substituted or unsubstituted benzyl of from 6 to 11 carbon atoms.

More preferably, the hexaarylbiimidazole is represented by Structure IC:

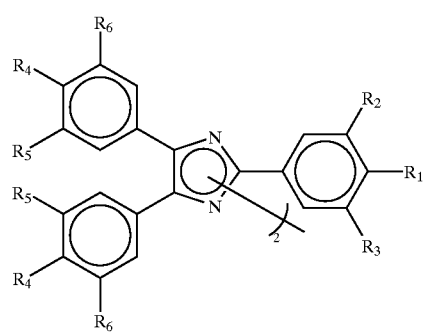

IC wherein $R_1$ is hydrogen or halogen; $R_2$ and $R_3$ are independently hydrogen, halogen, alkyl or substituted alkyl of 1 to about 10 carbons, aryl or substituted aryl of from 5 to about 10 carbons, a substituted or unsubstituted benzyl, cyano; $R_4$, $R_5$, and $R_6$ are independently hydrogen, alkyl or substituted alkyl of 1 to about 6 carbons. The $R_4$, $R_5$, and $R_6$, groups may be independently selected for each ring, although preferably they are the same for both rings. The two monomers in Structure IC may be independently selected or may be identical. More preferably, the hexaarylbiimidazole is according to Structure IC wherein $R_1$, $R_2$, and $R_3$ are hydrogen; $R_4$ is alkyl or substituted alkyl of 1 to about 6 carbons; and $R_5$ and $R_6$ are hydrogen. Finally, the most preferred compound is according to Structure IC wherein $R_1$, $R_2$, and $R_3$ are hydrogen, $R_4$ is isopropyl; and $R_5$, and $R_6$ are hydrogen.

Important teachings relating to hexaarylbiimidazoles have been published by Aldag, *Photochromism, Molecules and Systems*, Durr and Bouras-Laurent (Eds.), Chapter 18, pages 714–717, Elsevier, 1990. A single triarylimidazole can conceivably give rise to different structural dimers if the dimer linkage is made via C—N, C—C or N—N bonds. These individual structural dimers or mixtures thereof can be generated chemically, thermally or photolytically from a common triarylimidazoyl radical. While the dimers specifically described herein are linked via a C—N bond (2-carbon atom of one imidazole and nitrogen atom of the other imidazole), the present invention is not so limited.

If desired, a combination of hexaarylbiimidazole compounds can be used. An example of such a combination is the combination of compounds, within Structure (I), one compound (a) wherein all the R groups are hydrogen with a second compound (b) wherein $R_4$ and $R_1$ are isopropyl, with all other R groups being hydrogen.

Particular examples of hexaarylbiimidazole compounds are:

H-1
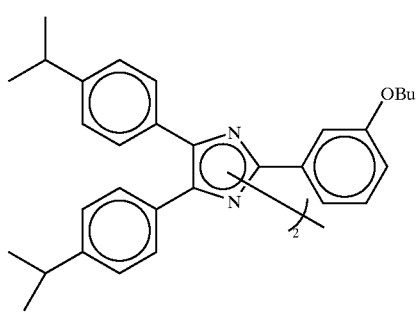
H-2
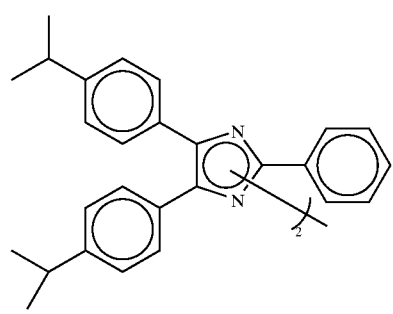
H-3
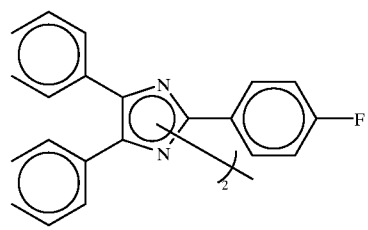
H-4
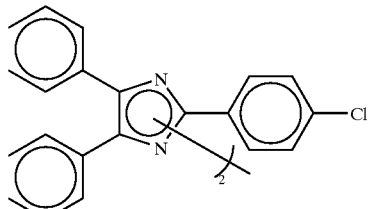
H-5
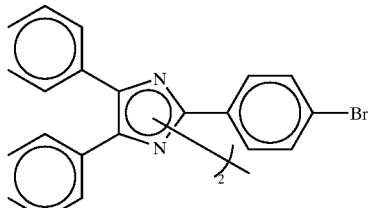
H-6
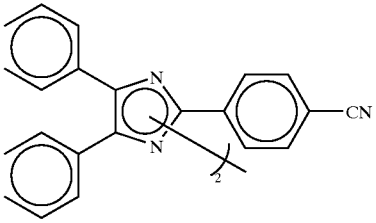
-continued
H-7
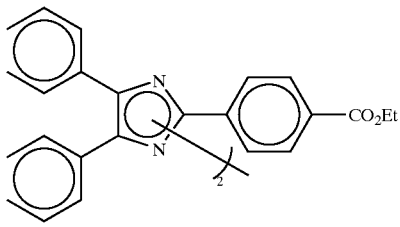
H-8
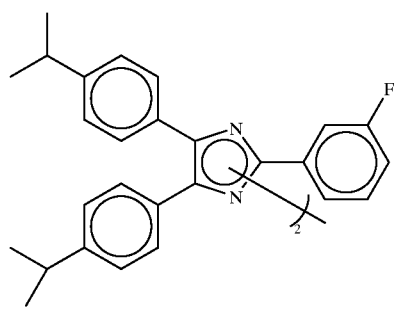
H-9
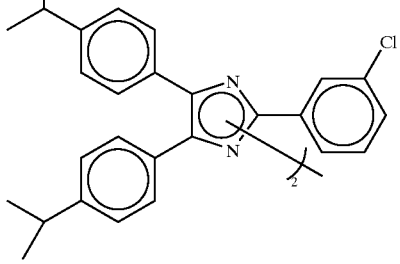
H-10
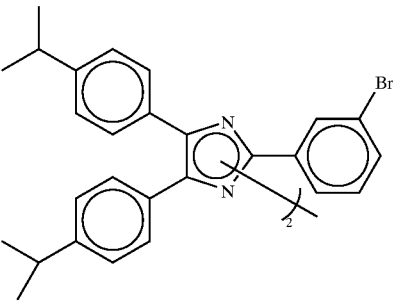
H-11
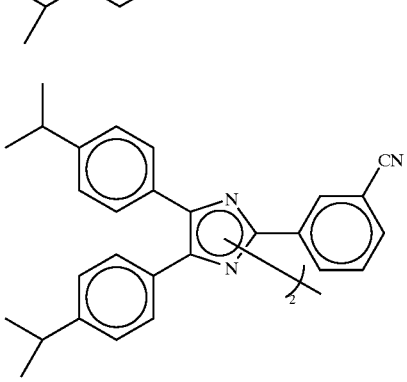

-continued

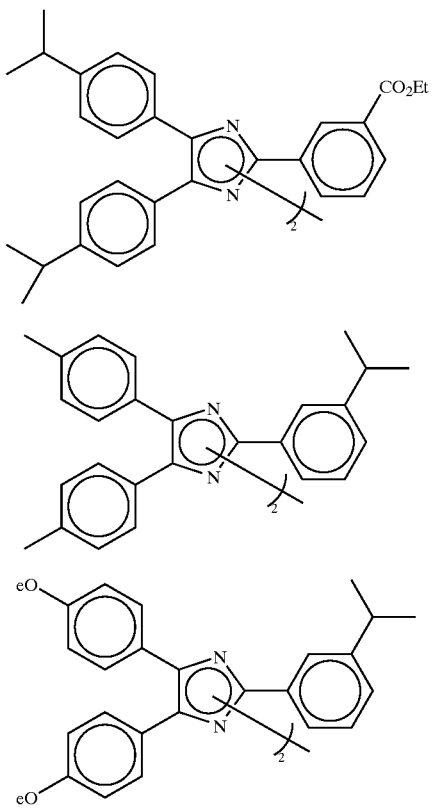

Selection of the hexaarylbiimidazole compound or combination of such compounds will depend upon such factors as the particular antihalation or filter dye or dyes to be used, processing conditions, desired degree of bleaching in the layer containing the dye or dyes, solubility characteristics of the components and the like.

A variety of dyes and dye precursors can be useful according to the invention with the described hexaarylbiimidazole compounds, but in general any dye or dye precursor can be used according to the invention which changes its color, i.e. changes its electromagnetic radiation absorption characteristics, upon reaction with what are believed to be triarylimidazoyl radicals provided upon heating the described hexaarylbiimidazole compounds. For antihalation layer purposes for example, it is desirable that the heat bleachable layer have substantially uniform absorption in the spectral region in which the imaging composition is sensitive. The antihalation dye or dye precursor should also be changed to the extent that at least about 40%, and preferably at least 50%, more preferably at least 60%, still more preferably at least 80%, and most preferably at least 90% of the layer absorption is changed from colored to colorless according to a standard test using Status M density. Thus, the antihalation or filter layer, after bleaching, has minimal or substantially no optical density that will adversely affect the Dmin of the product during scanning, or during overall picture production using the photothermographic element.

A variety of dyes are known which can be bleached or converted to a colorless form using hexaarylbiimidazole, many of which are specifically disclosed in the prior art, including, for example, but not limited to squarylliums (sometimes referred to as "squarilliums"), oxonols, formazans, and other filter dyes, either water or solvent soluble, that are likewise bleachable.

Examples of formazan dyes are represented by the following Structure II:

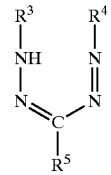

II wherein $R^3$ is a substituted or unsubstituted aromatic group of 5 to 20 atoms in the ring system, such as carbocyclic or heterocyclic aromatic rings. Preferably, $R^3$ is a substituted or unsubstituted coordinating aromatic group having 5 to 15 atoms in the ring system. Such aromatic groups can be carbocyclic or heterocyclic containing one or more nitrogen, oxygen or sulfur atoms.

$R^4$ can also be an aryl group (substituted or unsubstituted) having from 6 to 14 carbon atoms in the ring nucleus (such as phenyl, tolyl, xylyl, naphthyl, anthryl, p-nitrophenyl, benzthiophenyl, benzimidazoyl or pyridyl).

$R^5$ is an alkyl group (substituted or unsubstituted) of 1 to 20 carbon atoms (such as substituted or unsubstituted methyl, ethyl, n-propyl, isopropyl, t-butyl, hexyl, decyl, benzyl and other branched or linear hydrocarbons readily apparent to one skilled in the art), an aryl group (substituted or unsubstituted) of 6 to 14 carbon atoms in the ring (such as phenyl, xylyl, tolyl, naphthyl, 4-hydroxyphenyl, p-nitrophenyl, dimethoxyphenyl, anthroquinonyl and other substituted carbocyclic aromatic ring systems readily apparent to one skilled in the art), or a substituted or unsubstituted 5- to 7-membered heterocyclic group having 5 to 7 atoms in the ring nucleus, such as pyridyl, pyrimidyl, oxazyl, benzothiazolyl, benzimidazolyl, and others readily apparent to one skilled in the art. Particular formazan dyes (some in metallized form) that can be mentioned include those disclosed in U.S. Pat. No. 5,652,091 to Perry et al. and U.S. Pat. No. 4,201,590 to Levinson et al., hereby incorporated by reference in its entirety, for instance: (1) 1,3,5-triphenylformazan; (2) 1-(4-chlorophenyl)-3,5-diphenylformazan; (3) 1-p-nitrophenyl-3,5-(diphenyl) formazan; (4) 1,5diphenyl-3-methylformazan; (5) 1,5-diphenyl-3-(3-iodophenyl)formazan; (6) 1,5-diphenyl-3-(2-naphthyl)formazan; (7)1-(2-carboxyphenyl)-3,5-diphenylformazan and; (8) 1,5-diphenyl-3-(p-nitrophenyl) formazan. The formazan antihalation or filter dyes that are useful can be a metallized formazan dye, examples of which are zinc-formazan dye complexes, cobalt-formazan dye complexes, copper-formazan dye complexes, cadmium-formazan dye complexes and nickel-formazan dye complexes. Combinations of formazan dyes can also be useful, and metallized formazan dyes can also be useful in combination with metallized formazan dyes or formazan dyes that are not metallized. Combinations of formazan dyes can be useful to provide the desired degree of absorption. An example of a combination of formazan dyes is triphenylformazan with 1-(p-nitrophenyl)-3-methyl-5-phenylformazan.

Other useful formazan dyes are described, for example, in Research Disclosure, October 1974, Item 12617, pages 12–30, published by Industrial Opportunities Ltd., Homewell, Havant, Hampshire, PO9 1EF, UK. U.S. Pat. No. 3,227,556 of Oliver and Gates, issued Jan. 4, 1966; U.S. Pat. No. 3,050,393 of Macdonald, issued Aug. 21, 1962; and Chemical Reviews, 1955, beginning at page 356. These are also incorporated herein by reference. The formazan dyes and their preparation are known in the art. The formazan dyes can be prepared by procedures known in the art, such as described in Chemical Reviews, 1955, beginning at page 356.

Still another example of a preferred class of filter dyes that can be used in the present invention are oxonol dyes, including symmetrical and unsymmetrical tri, penta and heptamethine oxonol dyes derived from cyclic or acyclic (or both) ketomethylenes. Typical oxonol dyes can be represented by the following structure III:

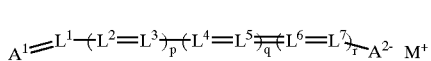

III wherein $A^1$ and $A^2$ are activated methylene moieties (including ketomethylene), $L^1$–$L^7$ each independently represent a substituted or unsubstituted methine group, $M^+$ is a cation, and p is one, q and r are independently 0 or 1.

Preferably, the oxonol is represented by the following Structure IIIA, IIIB or IIIC:

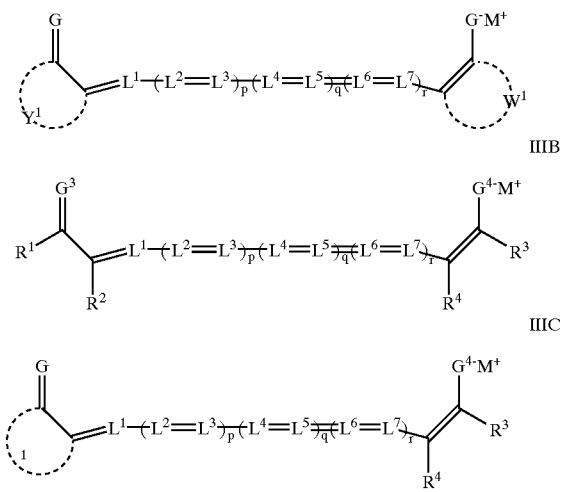

wherein $W^1$ and $Y^1$ are the atoms required to form a cyclic activated methylene or ketomethylene moiety; $R^1$ and $R^3$ are aromatic or heteroaromatic groups; $R^2$ and $R^4$ are electron-withdrawing groups; G–$G^4$ are independently O or dicyanovinyl (—C(CN)$_2$)) and p is one, q and r are independently 0 or 1, and $L^1$–$L^7$ each represent a substituted or unsubstituted methine groups. This divides the dyes of Structure III into oxonols derived from two cyclic activated methylene units (IIIA) such as pyrazolones or barbituric acids, two acyclic activated methylene units (IIIB) such as tricyanopropenes or benzoylacetonitriles, or one of each (IIIC). In all three substructures, however, the end groups need not be identical, but can be independently selected.

In Structure III above (with respect to $A^1$ and $A^2$) or in structures according to Structure IIIA, IIIB and IIIC, activated methylene (including ketomethylene) moieties are well known in the art and are described, for example, in Hamer, *The Cyanine Dyes and Related Compounds*, pages 469–494 and 595– 604. In accordance with the present invention, preferred activated methylene groups include, but are not restricted to those derived from benzoylacetonitrile, 2pyrazolin-5-one, pyrazolidindione, tricyanopropene, barbituric acid, indanedione, dicyanovinylindanedione, bis(dicyanovinyl)indanedione, pyrrolinone, furanone (such as cyanophenylfuranone and derivatives) benzothiophene dioxide, dicyanovinylbenzothiophene dioxide, rhodanine, benzofuranone, chromandione, cyclohexanedione, isoxazolinone, pyrazolopyridine, pyridone and pyrandione, and any of these moieties may be optionally substituted with ionic or non-ionic solubilizing group(s) or an ionizable group with a pKa value less than 4 in water. $W^1$ and $Y^1$ are the atoms required to form a carbocyclic or heterocyclic ketomethylene moiety.

In Structure III, IIIA, IIIB and IIIC, $M^+$ is a cation such as $H^+$, $Et_3NH^+$, $C_5H_5NH^+$, $Na^+$, and $K^+$. "Group" wherever used in the present application includes the possibility of being substituted or unsubstituted. $R^2$, $R^4$, $E^1$ and $E^2$ are electron-withdrawing substituents which are discussed in March, *Advanced Organic Chemistry*, pages 20–21, 228–229, 386–387 and 494–497. Groups for $R^2$, $R^4$, $E^1$ and $E^2$ may include cyano, acyl, benzoyl, phenacyl, aminocarbonyl, alkoxycarbonyl, aryl, nitro or arylsulfonyl or alkylsulfonyl.

Any L group may be substituted or unsubstituted. This includes the possibility that any of them may be members of a 5 or 6-membered ring.

Methine groups may be substituted with, for example, an alkyl, alkenyl, aryl, aralkyl, cycloalkyl, or heterocyclic group or, as mentioned above, if more than one of p, q, or r is 1, two or more methine groups together with their substituents may form a 5- or 6-membered carbocyclic or heterocyclic ring.

In general, when reference in this application is made to a particular moiety or group it is to be understood that such reference encompasses that moiety whether unsubstituted or substituted with one or more substituents (up to the maximum possible number). For example, "alkyl" or "alkyl group" refers to a substituted or unsubstituted alkyl, while "benzene group" refers to a substituted or unsubstituted benzene (with up to six substituents). Generally, unless otherwise specifically stated, substituent groups usable on molecules herein include any groups, whether substituted or unsubstituted, which do not destroy properties necessary for the photographic utility. Examples of substituents on any of the mentioned groups can include known substituents, such as: halogen, for example, chloro, fluoro, bromo, iodo; hydroxy; alkoxy, particularly those "lower alkyl" (that is, with 1 to 6 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted or unsubstituted alkenyl, preferably of 2 to 10 carbon atoms (for example, ethenyl, propenyl, or butenyl); substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups such as any of those described below; hydroxylate, amino, alkylamino, cyano, nitro, carboxy, carboxylate, acyl, alkoxycarbonyl, aminocarbonyl, sulfonamido, sulfamoyl, sulfo, sulfonate, alkylammonium, and an ionizable group with a pKa value below 4 in water; and others known in the art. Alkyl substituents may specifically include "lower alkyl" (that is, having 1–6 carbon atoms), for example, methyl, ethyl, and the like. Further, with regard to any alkyl group or alkylene group, it will be understood that these can be branched or unbranched and include ring structures. Preferred compounds are derived from pyrazolones, indanediones and thienonedioxide oxonols. Oxonols include chain alkyl and chain acyl dyes, in which alkyl or acyl groups are attached to the central moiety between the end groups.

A preferred group of oxonol dyes can be represented by Structure IV below:

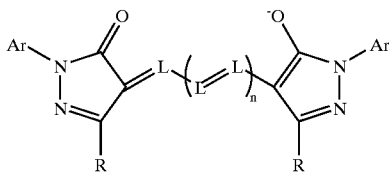

IV wherein n is 1 to 3 and each Ar is independently a substituted or unsubstituted aryl or heterocyclic group, and each R is independently a substituted or unsubstituted alkyl, hydrogen, carboxyalkyl, acyl, aryl or alkenyl group and each L independently represents a substituted or unsubstituted methine group. Examples of particularly useful oxonol dyes for use in this invention are dyes of formulae IV-1, IV-2, IV-3, IV-4, and V-5:

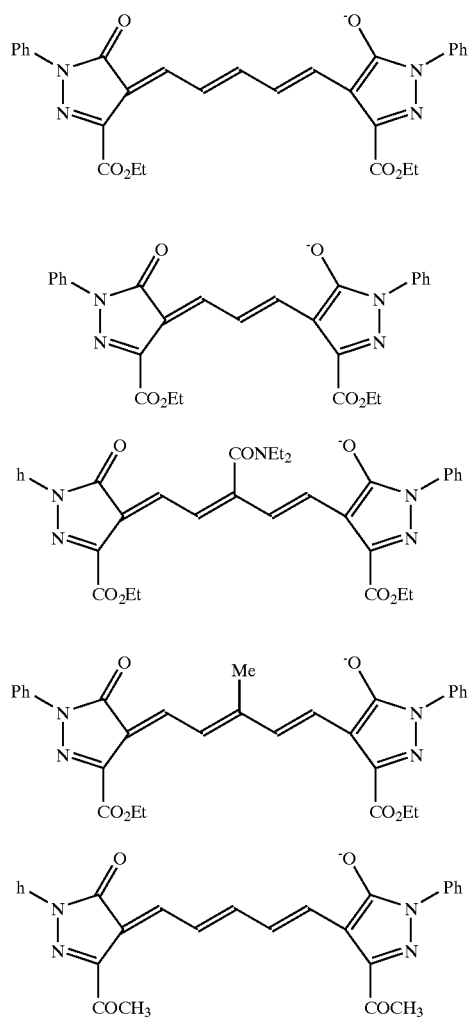

Still another example of a class of filter dyes that can be used in the present invention are squaryllium dyes represented by the following Structure V:

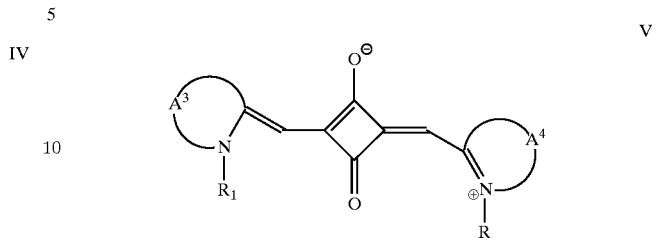

V wherein $A^3$ and $A^4$, which may be the same or different, completes substituted or unsubstituted heterocyclic or fused heterocyclic rings, preferably 5 to 12-membered unsaturated rings, or wherein $A^3$ or $A^4$ completes substituted or unsubstituted carbocyclic rings, preferably 5 to 12-membered unsaturated rings; and R and $R_1$ independently represents alkyl, substituted alkyl or aryl, preferably having 1–6 carbon atoms. Further examples of squaryllium dyes can be found in U.S. Pat. No. 4,743,531 to Farid et al. (exemplified in Table II) and U.S. Pat. No. 4,175,956 and U.S. Pat. No. 4,743,530 to Haley et al., hereby incorporated by reference in their entirety.

Particular examples of squaryllium dyes are:

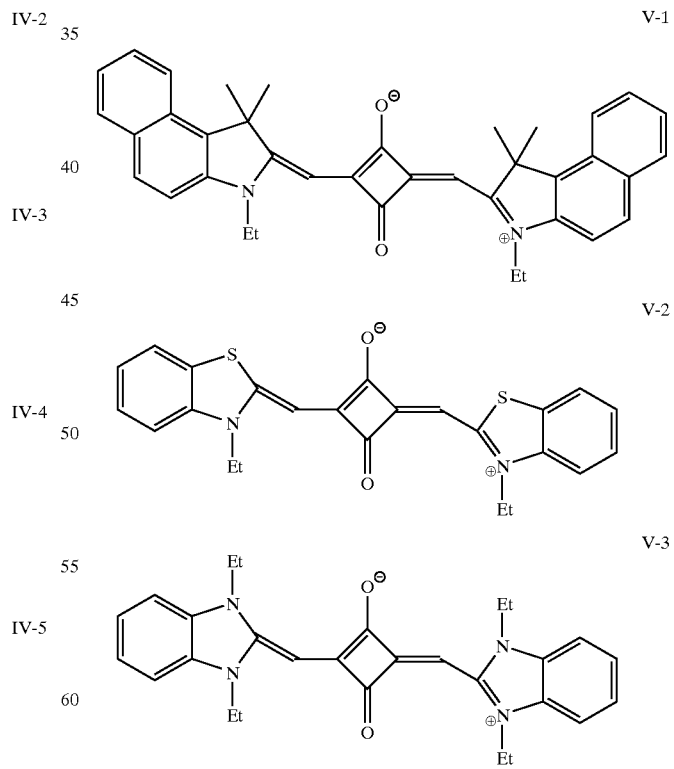

-continued

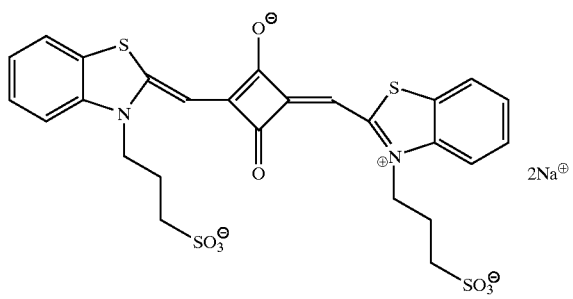

V-4

More than one filter dye can be used in the same layer. Combinations of different filter dyes can be used in the same layer or in different layers, depending on the purpose of the dye. Preferably, the filter dyes useful in an antihalation layer according to the present invention absorbs mainly from about 400 to about 850 nm. Preferably, the dyes absorbing mainly (and relatively uniformly) at from about 500 to about 850 nm are used. In the case of filter layers, a yellow filter dye useful in an yellow filter layer according to the present invention absorbs mainly from about 400 to about 500 nm and will transmit most of the light in the range 500 to 850 nm. Preferably, a yellow filter dye will absorb mainly at from about 420 to about 480 nm and will transmit most of the light in the range 490 to 850 nm. Similarly, a magenta filter dye will absorb light mostly from 500 to 600 nm and preferably from 520 to 580 nm while transmitting most of the light shorter than 500 nm and longer than 600 nm.

Depending on the choice of the filter dye, it can be in the antihalation or filter layer in the form of solid particles, dissolved in a dispersed organic phase, emulsified, or dissolved in the aqueous matrix of the antihalation or filter layer. Although dissolving a water-soluble dye in the aqueous matrix is easiest, it is not universally preferred since one would generally prefer that the dye remain in the layer in which it was coated.

The coverages and proportions of the components which comprise the described antihalation or filter component of the present invention can vary over wide ranges depending upon such factors as the particular use, location in the element of the antihalation or filter component, the desired degree of absorption, processing temperatures, and the like. For example, in some photothermographic elements the concentration of dye is sufficient to provide a peak optical density of at least about 0.05. For antihalation purposes, it is desirable that the concentration of the dye be sufficient to provide an optical density of at least about 0.2 such as about 0.3 to about 2.0, throughout the visible spectrum. The hexaarylbiimidazole must be present in at least sufficient concentration to provide at least 40% bleaching of the described dye, by standard testing specified herein. A suitable concentration of filter dye varies within the range of 0.20 to 20.0 moles of the hexaarylbiimidazole to 1.0 mole of dye. Typically, an excess of the hexaarylbiimidazole compound insures the desired degree of reaction with the described dye in the elements in which the dye is used. The preferred molar ratio of hexaarylbiimidazole compound to dye is within the range of about 0.4 to about with an especially useful ratio being about 1.0 to 5.0. The exact mechanism by which the described dye and dye-containing layer change from colored to colorless is not completely understood. However, it is believed that the hexaarylbiimidazole compound upon heating forms triarylimidazoyl radicals which react with the dye in a manner which changes the dye structure from colored to a less highly colored material.

The particles of hexaarylbiimidazole ("HABI particles) can be made by conventional dispersion techniques, such as milling, by preparing the particles by a limited coalescence procedure, or other procedures known in the art. Milling processes that can be used include, for example, processes described in U.K. Patent No. 1,570,632, and U.S. Pat. Nos. 3,676,147, 4,006,025, 4,474,872 and 4,948,718, the entire disclosures of which are incorporate herein by reference. Limited coalescence procedures that can be used include, for example, the procedures described in U.S. Pat. Nos. 4,994,3132, 5,055,371, 2,932,629, 2,394,530, 4,833,060, 4,834,084, 4,965,131 and 5,354,799, the entire disclosures of which are incorporated herein by reference. A suitable average size of the particles are 10 to 5000 nm, preferably 20 to 1000 nm, most preferably 30 to 500 nm.

In a preferred embodiment, the HABI is dispersed in the binder in the form of a solid particle dispersion. Such dispersions can be formed by either milling the dye in solid form until the desired particle size range is reached, or by precipitating (from a solvent solution) the dye directly in the form of a solid particle dispersion. In the case of solid particle milling dispersal methods, a coarse aqueous premix, containing the HABI and water, and optionally, any desired combination of water soluble surfactants and polymers, is made, and added to this premix prior to the milling operation. The resulting mixture is then loaded into a mill. The mill can be, for example, a ball mill, media mill, jet mill, attritor mill, vibratory mill, or the like. The mill is charged with the appropriate milling media such as, for example, beads of silica, silicon nitride, sand, zirconium oxide, yttria-stabilized zirconium oxide, alumina, titanium, glass, polystyrene, etc. The bead sizes typically range from 0.25 to 3.0 mm in diameter, but smaller media may be used if desired. The solid HABI particles in the slurry are subjected to repeated collisions with the milling media, resulting in crystal fracture and consequent particle size reduction.

The aqueous dispersion can further contain appropriate surfactants and polymers previously disclosed for use in making pH precipitated dispersions. For solvent precipitation, a solution of the dye is made in some water miscible, organic solvent. The solution of the dye is added to an aqueous solution containing appropriate surfactants and polymers to cause precipitation as previously disclosed for use in making solvent precipitated dispersions.

Surfactants and other additional conventional addenda may also be used in the dispersing process described herein in accordance with prior art solid particle dispersing procedures. Such surfactants, polymers and other addenda are disclosed in U.S. Pat. Nos. 5,468,598, 5,300,394, 5,278,037, 4,006,025, 4,924,916, 4,294,917, 4,940,654, 4,950,586, 4,927,744, 5,279,931, 5,158,863, 5,135,844, 5,091,296, 5,089,380, 5,103,640, 4,990,431,4,970,139, 5,256,527, 5,015,564, 5,008,179, 4,957,857, and 2,870,012, British Patent specifications Nos. 1,570,362 and 1,131,179 referenced above, the disclosures of which are hereby incorporated by reference, in the dispersing process of the filter dyes.

Additional surfactants or other water soluble polymers may be added after formation of the HABI dispersion, before or after subsequent addition of the small particle dispersion to an aqueous coating medium for coating onto a photographic element support. The aqueous medium preferably contains other compounds such as stabilizers and dispersants, for example, additional anionic nonionic, zwitterionic, or cationic surfactants, and water soluble binders such as gelatin as is well known in the photographic element art. The aqueous coating medium may further contain other dispersion or emulsions of compounds useful in photography. Another technique for forming solid HABI particles involves solvent precipitation. For example, a solution of the HABI can be made in some water miscible, organic solvent, after which the solution of the HABI can be added to an aqueous solution containing appropriate surfactants and polymers to cause precipitation.

Various techniques for forming a liquid dispersion of the HABI, including oil-in-water emulsions, are well known by the skilled artisan. An oil-in-water dispersion of the HABI may be prepared by dissolving the HABI in an organic liquid, forming a premix with an aqueous phase containing dispersing aids such as water-soluble surfactants, polymers and film forming binders such as gelatin, and passing the premix through a mill until the desired particle size is obtained. The mill can be any high energy device such as a colloid mill, high pressure homogenizer, ultrasonic device, or the like. Preparation of conventional oil-in-water dispersions are well known in the art and are described in further detail, for example, in Jelly and Vittum U.S. Pat. No. 2,322,027. Alternatively, the HABIs can be loaded into a latex polymer, either during or after polymerization, and the latex can be dispersed in a binder. Additional disclosure of loaded latexes can be found in Milliken U.S. Pat. No. 3,418,127.

The filter or antihalation dyes may be soluble or insoluble in the aqueous coated antihalation layer or filter layer according to the present invention. When the dye is insoluble and, therefore, also in the form of a dispersion, the HABI dispersion and the dye dispersion can be made simultaneously in one dispersion or they can be separately made in two dispersions and then later combined. In a separate dye dispersion, the dye may be added directly to, or dispersed in film forming polymeric vehicles and/or binders, as is well known in the art. These include both naturally occurring and synthetic binders, such as gelatin and gelatin derivatives, polyvinyl alcohols, acrylamide polymers, polyvinyl acetates, polyacrylates and the like. In certain instances, especially where the dye is mobile (e.g., a dye with one or more $SO_3$-constituents) it may be advantageous to use the dye in combination with a mordant, such as polyvinylimidazole and polyvinylpyridine, to aid in immobilizing the dye. The technology of mordanting dyes is well known in the art, and is described in further detail in Jones et al U.S. Pat. No. 3,282,699 and Heseltine et al U.S. Pat. Nos. 3,255,693 and 3,483,779.

The dye may be in the form of an oil-in-water dispersion of the dye be prepared or dispersed in the binder in the form of a solid particle dispersion as described with respect to the HABI above. The solid particle dispersions of the dye should have an average particle size of 0.01 to about 10 microns, preferably 0.05 to about 5 microns, and more preferably about 0.05 to about 3 microns. Most preferably, the solid particles are of sub-micron average size. In addition to solvent precipitation, the pH precipitation techniques can be used for forming solid dye particles. An aqueous solution of the dye can be made at relatively high pH then the pH is lowered to cause precipitation of the dye. The dye dispersion can further contain appropriate surfactants and polymers previously disclosed for use in making pH precipitated dispersions.

Combinations of bleachable filter or antihalation dyes can be used or one or more bleachable dyes can be used in combination with other non-bleachable dyes in the present invention to obtain a broader spectrum of absorption, if desired. For example, when the filter dye is used to provide antihalation properties or to permit room light loading, the filter dye should be selected to provide an absorption envelope that matches the sensitization envelope of the light sensitive layer(s) of the photographic element. Other filter dyes that can be used include, for example, the filter dyes disclosed in U.S. Pat. Nos. 2,538,008, 2,538,009, and 4,420,555, and UK Patents Nos. 695,873 and 760,739. It is preferred to use the filter dyes as solid particle dispersions as disclosed in U.S. Pat. Nos. 4,950,586, 4,948,718, 4,948,717, 4,940,654, 4,923,788, 4,900,653, 4,861,700, 4,857,446, 4,855,221, 5,213,956 and 5,213,957, and European Patent No. 430,186. The entire disclosures of the above patents are incorporated herein by reference.

Another aspect of the present invention is directed to a composition in the form of an aqueous dispersion comprising at least one antihalation or filter dye and at least one hexaarylbiimidazole compound, which aqueous dispersion comprises an aqueous phase and a dispersed organic phase, the aqueous phase comprising, as a binder, a soluble hydrophilic polymer or dispersed hydrophobic polymer and the dispersed organic phase comprising solid or liquid particles comprising said hexaarylbiimidazole compound, and wherein the hexaarylbiimidazole compound in said particles is capable of bleaching said dye when the dispersion is coated, dried and heated to a temperature of at least 90° C. for at least 0.5 seconds. The dye may be in the aqueous phase or in a separate dispersed organic phase. In one embodiment, solid particles comprising said hexaarylbiimidazole compound are employed. In another embodiment, an oil-in-water emulsion is employed. By the term "aqueous," with reference to this aqueous dispersion, is meant that that the aqueous phase comprises at least 10%, more preferably at least 20% by weight water, and most preferably at least 50% by weight water. Similarly, when aqueous coated onto a substrate, for example, in a photothermographic element, the term "aqueous," with reference to this coating composition, is meant that the coating composition comprises at least 10%, more preferably at least 20% water and most preferably at least 50% by weight water. Miscible organic solvents, mentioned below, can be optionally included. In the complete photothermographic imaging element, once dried, the amount of water in the aqueous coated antihalation or filter layer is at least about 1% by weight of the dried layer, but unless using a dispersible hydrophobic polymer, is usually higher, comprising at least 5% by weight water, preferably 10 to 15% by weight water, particularly in the case of a gelatin binder. Due to the limited solubility of some compounds, it is often desirable to use organic solvents to aid in preparation of the materials for coating to provide an element according to the invention. Typical organic solvents which can be useful in preparing a composition for coating as an antihalation layer or filter layer according to the invention include tetrahydrofuran, methylene chloride, ethanol, methanol, acetone and butanol. Mixing of the solvents with the described components according to the invention can be carried out using means known in the photographic art.

The binders used in the aqueous dispersion or coating composition should be transparent or translucent and include those materials which do not adversely affect the reaction which changes the dye from colored to colorless and which can withstand the processing temperatures employed. These polymers include, for example, proteins such as gelatin, gelatin derivatives, cellulose derivatives, polysaccharides such as dextran and the like; and synthetic polymeric substances such as water soluble polyvinyl compounds like poly(vinyl alcohol), poly(vinyl pyrrolidone), acrylamide polymers and the like. Other synthetic polymeric compounds which can be useful include dispersed vinyl compounds such as in latex form. Effective polymers include high molecular weight materials, polymers and resins which are compatible with the imaging materials of the element. Combinations of the described colloids and polymers can also be useful if desired.

A preferred binder for use in the present invention is oxidized gelatin, for example, gelatin treated with an oxidant such as hydrogen peroxide. Moll, "Investigations of Oxidized Gelatins", $2^{nd}$ Photographic Gelatin Symposium, sponsored by the Royal Photographic Society, Oxford, United Kingdom, Sept. 6, 1985, discloses some of the chemical and physical properties of oxidized gelatins. In general, oxidized gelatinopeptizers contain less than 30 micromoles per gram of methionine. Where the peptizer is gelatin or a gelatin derivative it can be treated prior to or during emulsion precipitation with a methionine oxidizing agent. Examples of methionine oxidizing agents include NaOCl, chloramine, potassium monopersulfate, hydrogen peroxide and peroxide releasing compounds, ozone, thiosulfates and alkylating agents. Specific illustrations are provided by Maskasky U.S. Pat. Nos. 4,713,320 and 4,713,323, King et al U.S. Pat. No. 4,942,120, Takada et al EPO 0 434 012 and Okumura et al EPO 0 553 622.

Without wishing to be bound by theory it is surmised that the methione group in gelatin, present in unoxidized gelatin, may react with the radicals derived from the hexaarylbiimidazole compound upon heating, which radicals are responsible for bleaching of the dye. Although higher amounts of the hexaarylbiimidazole may be used with unoxidized gelatin to improve its bleaching effect to some extent, the use of oxidized gelatin unexpectedly activates and enhances the bleaching effect of the hexaarylbiimidazole.

The antihalation layer as described can be useful in a variety of photothermographic elements. Useful photothermographic elements include those which are designed to provide an image from photographic silver halide, such as color images. Photothermographic color elements which are designed for consumer film are especially useful with the antihalation materials according to the invention.

The described combination of the hexaarylbiimidazole compound and dye can be in any suitable location in the photothermographic element which provides the desired bleaching of the dye upon heating. When the invention is utilized as an antihalation layer of a photographic material coated on a transparent support (such as photographic film), the inventive layer can be coated on the same side or the opposite of the support as the radiation sensitive layers. When the invention is utilized as an antihalation layer of a photographic material coated on a reflective support (such as photographic paper), then the inventive layer must be coated on the same side of the support as the radiation sensitive layers. When the invention is utilized as a filter layer of a photographic material, the same requirements apply depending upon the type of support used.

It is necessary that the dye and particles of the hexaarylbiimidazole compound be in reactive association with one another to provide the desired heat bleaching in the antihalation or filter component. The term "in reactive association" as employed herein is intended to mean that the described materials are in a location with respect to each other which enables the desired processing and heat bleaching and provides a more useful developed image. The term is also employed herein to mean that the hexaarylbiimidazole compound and the dye are in a location with respect to each other which enables the desired change of the dye from colored to colorless upon heating as described. In general, the two components should be in the same layer, meaning there is no significant barrier or distance between them even if not uniformly dispersed together. Preferably, however, the particles of hexaarylbiimidazole and the dye are uniformly interdispersed.

A preferred embodiment of the invention is a photothermographic element comprising (a) a support having thereon (b) a photothermographic layer, and on the support or in the support (c) at least one antihalation component comprising, in a polymeric binder, in reactive association, (i) solid particles of at least one compound represented by the formula (I), as described, with (ii) at least one dye, wherein the dye component becomes at least about 50, preferably at least 90% colorless within about 30 seconds upon heating to a temperature of at least about 120° C., as determined by standard testing described herein.

The antihalation or filter layer materials comprising the combination of the described dye with the hexaarylbiimidazole compound can be present in a suitable transparent support which permits the desired reaction between the described dye and hexaarylbiimidazole. However, it is more preferred that an antihalation layer according to the invention should comprise binders which adhere suitably to the support or other layer of the photothermographic element upon which the antihalation or filter layer is coated.

Selection of optimum binders for adhesion purposes will depend upon such factors as the particular support, processing conditions, the particular photosensitive layer, and the like.

A visible image can be developed in a photothermographic element according to the invention within a short time after imagewise exposure merely by uniformly heating the photothermographic element to moderately elevated temperatures. For example, the photothermographic element can be heated, after imagewise exposure, to a temperature within the range which provides development of the latent image and also provides the necessary temperature to cause the antihalation or filter layer to change from colored to colorless. Most broadly, this temperature is within the range of about 80° C. to about 250° C., such as within the range of about 110° C. to about 200° C. Heating is typically carried out until a desired image is developed and until the antihalation or filter layer is bleached to a desired degree. This heating time is typically a time within about 1 second to about 20 minutes, such as about 1 second to about 90 seconds.

A simple exemplary photothermographic element, showing one embodiment comprising filter and AHU layers and their placement in the element, can be represented as follows:

UV Overcoat
Blue Sensitive Layer
Yellow Filter Layer
Green Sensitive Layer
Magenta Filter Layer
Red Sensitive Layer
AHU Layer
Support As indicated above, the invention is useful in a dry photothermographic process (or "dry thermal process"). By a "dry thermal process" is meant herein a process involving, after imagewise exposure of the photographic element, development of the resulting latent image by the use of heat to raise the temperature of the photothermographic element or film to a temperature of at least about 80° C., preferably at least about 100° C., more preferably at about 120° C. to 180° C., in a dry process or an apparently dry process. By a "dry process" is meant without the external application of any aqueous solutions. By an "apparently dry process" is meant a process that, while involving the external application of at least some aqueous solutions, does not involve an amount more than the uniform saturation of the film with aqueous solution.

This dry thermal process typically involves heating the photothermographic element until a developed image is formed, such as within about 0.5 to about 60 seconds. By increasing or decreasing the thermal processing temperature a shorter or longer time of processing is useful. Heating means known in the photothermographic arts are useful for providing the desired processing temperature for the exposed photothermographic element. The heating means can, for example, be a simple hot plate, iron, roller, heated drum, microwave heater, heated air, vapor or the like. Thermal processing is preferably carried out under ambient conditions of pressure and humidity, for simplicity sake, although conditions outside of normal atmospheric pressure and humidity are also useful.

A dry thermal process for the development of a color photothermographic film for general use with respect to consumer cameras provides significant advantages in processing ease and convenience, since they are developed by the application of heat without wet processing solutions. Such film is especially amenable to development at kiosks or at home, with the use of essentially dry equipment. Thus, the dry photothermographic system opens up new opportunities for greater convenience, accessibility, and speed of development (from the point of image capture by the consumer to the point of prints in the consumer's hands), even essentially "immediate" development in the home for a wide cross-section of consumers.

Preferably, during thermal development an internally located blocked developing agent, in reactive association with each of three light-sensitive units, becomes unblocked to form a developing agent, whereby the unblocked developing agent is imagewise oxidized on development. It is necessary that the components of the photographic combination be "in association" with each other in order to produce the desired image. The term "in association" herein means that. in the photothermographic element, the photographic silver halide and the image-forming combination are in a location with respect to each other that enables the desired processing and forms a useful image. This may include the location of components in different layers.

The present invention is applicable to a photothermographic element, inclusive of film and paper, black & white and color. Such photothermographic elements are used in the field of microfilming, health imaging, graphic arts, consumer products, and the like. It is especially useful where the element is exposed to visible light, directly or indirectly, in the field of health or medical imaging involving phosphorescent light, the originating exposure may be X-ray, for example. A preferred use of the present invention is in consumer color photothermographic film.

A typical photothermographic element will now be described. The support for the photothermographic element can be either reflective or transparent, which is usually preferred. When reflective, the support is white and can take the form of any conventional support currently employed in color print elements. When the support is transparent, it can be colorless or tinted and can take the form of any conventional support currently employed in color negative elements-e.g., a colorless or tinted transparent film support. Details of support construction are well understood in the art. Examples of useful supports are poly(vinylacetal) film, polystyrene film, poly(ethyleneterephthalate) film, poly (ethylene naphthalate) film, polycarbonate film, and related films and resinous materials, as well as paper, cloth, glass, metal, and other supports that withstand the anticipated processing conditions. The element can contain additional layers, such as filter layers, interlayers, overcoat layers, subbing layers, antihalation layers and the like. Transparent and reflective support constructions, including subbing layers to enhance adhesion, are disclosed in Section XV of *Research Disclosure* I.

Photographic elements may also usefully include a magnetic recording material as described in *Research Disclosure*, Item 34390, November 1992, or a transparent magnetic recording layer such as a layer containing magnetic particles on the underside of a transparent support as in U.S. Pat. No. 4,279,945, and U.S. Pat. No. 4,302,523.

In an example (one embodiment) of a color negative film construction, each of blue, green and red recording layer units BU, GU and RU are formed of one or more hydrophilic colloid layers and contain at least one radiation-sensitive silver halide emulsion and coupler, including at least one dye image-forming coupler. It is preferred that the green, and red recording units are subdivided into at least two recording layer sub-units to provide increased recording latitude and reduced image granularity. In the simplest contemplated construction each of the layer units or layer sub-units consists of a single hydrophilic colloid layer containing emulsion and coupler. When coupler present in a layer unit or layer sub-unit is coated in a hydrophilic colloid layer other than an emulsion containing layer, the coupler containing hydrophilic colloid layer is positioned to receive oxidized color developing agent from the emulsion during development. Usually the coupler containing layer is the next adjacent hydrophilic colloid layer to the emulsion containing layer.

BU contains at least one yellow dye image-forming coupler, GU contains at least one magenta dye image-forming coupler, and RU contains at least one cyan dye image-forming coupler. Any convenient combination of conventional dye image-forming couplers can be employed. Conventional dye image-forming couplers are illustrated by *Research Disclosure* I, cited above, X. Dye image formers and modifiers, B. Image-dye-forming couplers. The photographic elements may further contain other image-modifying compounds such as "Development Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346,899; 362,870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography,"

C.R. Barr, J. R. Thirtle and P. W. Vittum in *Photographic Science and Engineering*, Vol. 13, p. 174 (1969), incorporated herein by reference.

It is common practice to coat one, two or three separate emulsion layers within a single dye image-forming layer unit. When two or more emulsion layers are coated in a single layer unit, they are typically chosen to differ in sensitivity. When a more sensitive emulsion is coated over a less sensitive emulsion, a higher speed is realized than when the two emulsions are blended. When a less sensitive emulsion is coated over a more sensitive emulsion, a higher contrast is realized than when the two emulsions are blended. It is preferred that the most sensitive emulsion be located nearest the source of exposing radiation and the slowest emulsion be located nearest the support.

One or more of the layer units of the invention is preferably subdivided into at least two, and more preferably three or more sub-unit layers. It is preferred that all light sensitive silver halide emulsions in the color recording unit have spectral sensitivity in the same region of the visible spectrum. In this embodiment, while all silver halide emulsions incorporated in the unit have spectral absorptances according to invention, it is expected that there are minor differences in spectral absorptance properties between them. In still more preferred embodiments, the sensitizations of the slower silver halide emulsions are specifically tailored to account for the light shielding effects of the faster silver halide emulsions of the layer unit that reside above them, in order to provide an imagewise uniform spectral response by the photographic recording material as exposure varies with low to high light levels. Thus higher proportions of peak light absorbing spectral sensitizing dyes may be desirable in the slower emulsions of the subdivided layer unit to account for on-peak shielding and broadening of the underlying layer spectral sensitivity.

The photothermographic element may have interlayers that are hydrophilic colloid layers having as their primary function color contamination reduction-i.e., prevention of oxidized developing agent from migrating to an adjacent recording layer unit before reacting with dye-forming coupler. The interlayers are in part effective simply by increasing the diffusion path length that oxidized developing agent must travel. To increase the effectiveness of the interlayers to intercept oxidized developing agent, it is conventional practice to incorporate a reducing agent capable of reacting with oxidized developing agent. . Antistain agents (oxidized developing agent scavengers) can be selected from among those disclosed by *Research Disclosure* I, X. Dye image formers and modifiers, D. Hue modifiers/stabilization, paragraph (2). When one or more silver halide emulsions in GU and RU are high bromide emulsions and, hence have significant native sensitivity to blue light, it is preferred to incorporate a yellow filter, such as Carey Lea silver or a yellow processing solution decolorizable dye, in IL1. Suitable yellow filter dyes can be selected from among those illustrated by *Research Disclosure* I, Section VIII. Absorbing and scattering materials, B. Absorbing materials. In elements of the instant invention, magenta colored filter materials are absent from IL2 and RU.

A photothermographic element may comprise a surface overcoat SOC which is a hydrophilic colloid layer that is provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research Disclosure* I, Section IX. Coating physical property modifying addenda. The SOC overlying the emulsion layers additionally preferably contains an ultraviolet absorber, such as illustrated by *Research Disclosure* I, Section VI. UV dyes/optical brighteners/luminescent dyes, paragraph (1).

Alternative layer units sequences can be employed and are particularly attractive for some emulsion choices. Using high chloride emulsions and/or thin (<0.2 $\mu$m mean grain thickness) tabular grain emulsions all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers. A number of modifications of color negative elements have been suggested for accommodating scanning, as illustrated by *Research Disclosure* I, Section XIV. Scan facilitating features. These systems to the extent compatible with the color negative element constructions described above are contemplated for use in the practice of this invention.

It is also contemplated that the imaging element of this invention may be used with non-conventional sensitization schemes. For example, instead of using imaging layers sensitized to the red, green, and blue regions of the spectrum, the light-sensitive material may have one white-sensitive layer to record scene luminance, and two color-sensitive layers to record scene chrominance. Following development, the resulting image can be scanned and digitally reprocessed to reconstruct the full colors of the original scene as described in U.S. Pat. No. 5,962,205. The imaging element may also comprise a pan-sensitized emulsion with accompanying color-separation exposure. In this embodiment, the developers of the invention would give rise to a colored or neutral image which, in conjunction with the separation exposure, would enable full recovery of the original scene color values. In such an element, the image may be formed by either developed silver density, a combination of one or more conventional couplers, or "black" couplers such as resorcinol couplers. The separation exposure may be made either sequentially through appropriate filters, or simultaneously through a system of spatially discreet filter elements (commonly called a "color filter array").

The imaging element of the invention may also be a black and white image-forming material comprised, for example, of a pan-sensitized silver halide emulsion and a developer of the invention. In this embodiment, the image may be formed by developed silver density following processing, or by a coupler that generates a dye which can be used to carry the neutral image tone scale.

The photothermographic elements of the present invention are preferably of type B as disclosed in *Research Disclosure* I. Type B elements contain in reactive association a photosensitive silver halide, a reducing agent or developer, optionally an activator, a coating vehicle or binder, and a salt or complex of an organic compound with silver ion. In these systems, this organic complex is reduced during development to yield silver metal. The organic silver salt will be referred to as the silver donor. References describing such imaging elements include, for example, U.S. Pat. Nos. 3,457,075; 4,459,350; 4,264,725 and 4,741,992. In the type B photothermographic material it is believed that the latent image silver from the silver halide acts as a catalyst for the described image-forming combination upon processing. In these systems, a preferred concentration of photographic silver halide is within the range of 0.01 to 100 moles of photographic silver halide per mole of silver donor in the photothermographic material.

The Type B photothermographic element comprises an oxidation-reduction image forming combination that contains an organic silver salt oxidizing agent. The organic silver salt is a silver salt which is comparatively stable to light, but aids in the formation of a silver image when heated to 80° C. or higher in the presence of an exposed photocatalyst (i.e., the photosensitive silver halide) and a reducing agent.

Suitable organic silver salts include silver salts of organic compounds having a carboxyl group. Preferred examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laureate, silver caprate, silver myristate, silver palmitate, silver maleate, silver fumarate, silver tartarate, silver furoate, silver linoleate, silver butyrate and silver camphorate, mixtures thereof, etc. Silver salts which are substitutable with a halogen atom or a hydroxyl group can also be effectively used. Preferred examples of the silver salts of aromatic carboxylic acid and other carboxyl group-containing compounds include silver benzoate, a silver-substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, etc., silver gallate, silver tannate, silver phthalate, silver terephthalate, silver salicylate, silver phenylacetate, silver pyromellilate, a silver salt of 3-carboxymethyl-4methyl-4-thiazoline-2-thione or the like as described in U.S. Pat. No. 3,785,830, and silver salt of an aliphatic carboxylic acid containing a thioether group as described in U.S. Pat. No. 3,330,663. Preferred examples of organic silver donors include a silver salt of benzotriazole and a derivative thereof as described in Japanese patent publications 30270/69 and 18146/70, for example a silver salt of benzotriazole or methylbenzotriazole, etc., a silver salt of a halogen substituted benzotriazole, such as a silver salt of 5-chlorobenzotriazole, etc., a silver salt of 1,2,4-triazole, a silver salt of 3-amino-5-mercaptobenzyl-1,2,4-triazole, of 1H-tetrazole as described in U.S. Pat. No. 4,220,709, a silver salt of imidazole and an imidazole derivative, and the like.

It is also found convenient to use silver half soap, of which an equimolar blend of a silver behenate with behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing not more than about 4 or percent of free behenic acid and analyzing about 25.2 percent silver may be used. A method for making silver soap dispersions is well known in the art and is disclosed in *Research Disclosure* October 1983 (23419) and U.S. Pat. No. 3,985,565.

Silver salts complexes may also be prepared by mixture of aqueous solutions of a silver ionic species, such as silver nitrate, and a solution of the organic ligand to be complexed with silver. The mixture process may take any convenient form, including those employed in the process of silver halide precipitation. A stabilizer may be used to avoid flocculation of the silver complex particles. The stabilizer may be any of those materials known to be useful in the photographic art, such as, but not limited to, gelatin, polyvinyl alcohol or polymeric or monomeric surfactants.

The photosensitive silver halide grains and the organic silver salt are coated so that they are in catalytic proximity during development. They can be coated in contiguous layers, but are preferably mixed prior to coating. Conventional mixing techniques are illustrated by *Research Disclosure*, Item 17029, cited above, as well as U.S. Pat. No. 3,700,458 and published Japanese patent applications Nos. 32928/75, 13224/74, 17216/75 and 42729/76.

Any convenient selection from among conventional radiation-sensitive silver halide emulsions can be incorporated within the layer units and used to provide the spectral absorptances of the invention. Most commonly high bromide emulsions containing a minor amount of iodide are employed. To realize higher rates of processing, high chloride emulsions can be employed. Radiation-sensitive silver chloride, silver bromide, silver iodobromide, silver iodochloride, silver chlorobromide, silver bromochloride, silver iodochlorobromide and silver iodobromochloride grains are all contemplated. The grains can be either regular or irregular (e.g., tabular). Illustrations of conventional radiation-sensitive silver halide emulsions are provided by *Research Disclosure* I, cited above, I. Emulsion grains and their preparation. Chemical sensitization of the emulsions, which can take any conventional form, is illustrated in section IV. Chemical sensitization. The emulsion layers also typically include one or more antifoggants or stabilizers, which can take any conventional form, as illustrated by section VII. Antifoggants and stabilizers.

The silver halide grains to be used in a photothermographic element may be prepared according to methods known in the art, such as those described in *Research Disclosure* I, cited above, and James, The Theory of the Photographic Process. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation. In the course of grain precipitation one or more dopants (grain occlusions other than silver and halide) can be introduced to modify grain properties.

In a photothermographic element, the silver halide is typically provided in the form of an emulsion, including a vehicle for coating the emulsion as a layer of the element. Useful vehicles include both naturally occurring substances such as proteins, protein derivatives, cellulose derivatives (e.g., cellulose esters, ethers, and both anionically and cationically substituted cellulosics), gelatin (e.g., alkali-treated gelatin such as cattle bone or hide gelatin, or acid treated gelatin such as pigskin gelatin), deionized gelatin, gelatin derivatives (e.g., acetylated gelatin, phthalated gelatin, and the like), and others as described in *Research Disclosure*, I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers. The vehicle can be present in the emulsion in any amount useful in photographic emulsions. The emulsion can also include any of the addenda known to be useful in photographic emulsions.

While any useful quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements.

Because in one embodiment of the invention only silver development is required, color developers (p-phenylene diamines or p-aminophenolics) are not obligatory. Other developers that are capable of forming a silver image may also be used, without regard to their ability to form a colored dye. Such developers include, in addition to p-phenylene diamine developers and substituted p-aminophenols (3,5-dichloroaminophenol and 3,5-dibromoaminophenol are particularly preferred choices) but also p-sulfonamidophenols, ascorbic acid, low valent metal compounds, particularly those containing Fe(II), Cu(I), Co(II), Mn(II), V(II), or Ti(III), hydrazine derivatives, hydroxylamine derivatives, phenidones. For incorporated developers, thermally unblocking blocked developers are preferred.

In some cases, a development activator, also known as an alkali-release agent, base-release agent or an activator precursor can be useful in the described photothermographic element of the invention. A development activator, as described herein, is intended to mean an agent or a compound which aids the developing agent at processing temperatures to develop a latent image in the imaging material. Useful development activators or activator precursors are described, for example, in Belgian Pat. No. 709,967 published Feb. 29, 1968, and Research Disclosure, Volume 155, Mar. 1977, Item 15567, published by Industrial Opportunities Ltd., Homewell, Havant, Hampshire, PO9 1EF, UK. Examples of useful activator precursors include guanidinium compounds such as guanidinium trichloroacetate, diguanidinium glutarate, succinate, malonate and the like; quaternary ammonium malonates; amino acids, such as 6-aminocaproic acid and glycine; and 2-carboxycarboxamide activator precursors.

Examples of blocked developers that can be used in photographic elements of the present invention include, but are not limited to, the blocked developing agents described in U.S. Pat. No. 3,342,599, to Reeves; Research Disclosure (129 (1975) pp. 27–30) published by Kenneth Mason Publications, Ltd., Dudley Annex, 12a North Street, Emsworth, Hampshire P010 7DQ, ENGLAND; U.S. Pat. No. 4,157,915, to Hamaoka et al.; U.S. Pat. No. 4,060,418, to Waxman and Mourning; and in U.S. Pat. No. 5,019,492. Particularly useful are those blocked developers described in U.S. application serial No. 09/476,234, filed Dec. 30, 1999, IMAGING ELEMENT CONTAINING A BLOCKED PHOTOGRAPICALLY USEFUL COMPOUND; U.S. application Ser. No. 09/475,691, filed Dec. 30, 1999, IMAGING ELEMENT CONTAINING A BLOCKED PHOTOGRAPHICALLY USEFUL COMPOUND; U.S. application Ser. No. 09/475,703, filed Dec. 30, 1999, IMAGING ELEMENT CONTAINING A BLOCKED PHOTOGRAPHICALLY USEFUL COMPOUND; U.S. application Ser. No. 09/475,690, filed Dec. 30, 1999, IMAGING ELEMENT CONTAINING A BLOCKED PHOTOGRAPHICALLY USEFUL COMPOUND; and U.S. application Ser. No. 09/476,233, filed Dec. 30, 1999, PHOTOGRAPHIC OR photothermographic ELEMENT CONTAINING A BLOCKED PHOTOGRAPHICALLY USEFUL COMPOUND.

In one embodiment of the invention, the blocked developer is preferably incorporated in one or more of the imaging layers of the imaging element. The amount of blocked developer used is preferably 0.01 to 5 g/m$^2$, more preferably 0.1 to 2 g/m$^2$ and most preferably 0.3 to 2 g/m$^2$ in each layer to which it is added. These may be color forming or non-color forming layers of the element. The blocked developer can be contained in a separate element that is contacted to the photographic element during processing.

After image-wise exposure of the imaging element, the blocked developer can be activated during processing of the imaging element by the presence of acid or base in the processing solution, by heating the imaging element during processing of the imaging element, and/or by placing the imaging element in contact with a separate element, such as a laminate sheet, during processing. The laminate sheet optionally contains additional processing chemicals such as those disclosed in Sections XIX and XX of *Research Disclosure*, September 1996, Number 389, Item 38957 (hereafter referred to as ("*Research Disclosure* I"). All sections referred to herein are sections of *Research Disclosure* I, unless otherwise indicated. Such chemicals include, for example, sulfites, hydroxyl amine, hydroxamic acids and the like, antifoggants, such as alkali metal halides, nitrogen containing heterocyclic compounds, and the like, sequestering agents such as an organic acids, and other additives such as buffering agents, sulfonated polystyrene, stain reducing agents, biocides, desilvering agents, stabilizers and the like.

A reducing agent may be included in the photothermographic element. The reducing agent for the organic silver salt may be any material, preferably organic material, that can reduce silver ion to metallic silver. Conventional photographic developers such as 3-pyrazolidinones, hydroquinones, p-aminophenols, p-phenylenediamines and catechol are useful, but hindered phenol reducing agents are preferred. The reducing agent is preferably present in a concentration ranging from 5 to 25 percent of the photothermographic layer.

A wide range of reducing agents has been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and ascorbic acid, such as 2,2'-bis(hydroxymethyl)propionylbetaphenyl hydrazide in combination with ascorbic acid; an combination of polyhydroxybenzene and hydroxylamine, a reductone and/or a hydrazine, e.g., a combination of hydroquinone and bis (ethoxyethyl)hydroxylamine, piperidinohexose reductone or formyl-4-methylphenylhydrazine, hydroxamic acids such as phenylhydroxamic acid, p-hydroxyphenyl-hydroxamic acid, and o-alaninehydroxamic acid; a combination of azines and sulfonamidophenols, e.g., phenothiazine and 2,6-dichloro-4-benzenesulfonamidophenol; α-cyano-phenylacetic acid derivatives such as ethyl α-cyano-2-methylphenylacetate, ethyl α-cyano-phenylacetate; bis-β-naphthols as illustrated by 2,2'-dihydroxyl-1-binaphthyl, 6,6'-dibromo-2,2'-dihydroxy-1,1'-binaphthyl, and bis(2-hydroxy-1-naphthyl) methane; a combination of bis-o-naphthol and a 1,3-dihydroxybenzene derivative, (e. g., 2,4-dihydroxybenzophenone or 2,4-dihydroxyacetophenone); 5-pyrazolones such as 3-methyl-1-phenyl-5-pyrazolone;

reductones as illustrated by dimethylaminohexose reductone, anhydrodihydroaminohexose reductone, and anhydrodihydro-piperidone-hexose reductone; sulfamidophenol reducing agents such as 2,6-dichloro-4-benzenesulfon-amido-phenol, and p-benzenesulfonamidophenol; 2-phenylindane-1,3-dione and the like; chromans such as 2,2-dimethyl-7-t-butyl-6-hydroxychroman; 1,4-dihydropyridines such as 2,6-dimethoxy-3,5-dicarbethoxy-1,4-dihydropyridene; bisphenols, e.g., bis(2hydroxy-3-t-butyl-5-methylphenyl)-methane; 2,2-bis(4-hydroxy-3-methylphenyl)propane; 4,4-ethylidene-bis(2-t-butyl-6-methylphenol); and 2,2-bis(3,5-dimethyl4-hydroxyphenyl) propane; ascorbic acid derivatives, e.g., 1-ascorbyl-palmitate, ascorbylstearate and unsaturated aldehydes and ketones, such as benzyl and diacetyl; pyrazolidin-3-ones; and certain indane-1,3-diones.

An optimum concentration of organic reducing agent in the photothermographic element varies depending upon such factors as the particular photothermographic element, desired image, processing conditions, the particular organic silver salt and the particular oxidizing agent.

It is useful to include a melt-forming compound or melt former (also sometimes referred to as a "thermal solvent") in a photothermographic element, such as in the imaging layers and in the antihalation layer or filter layer, as described. Combinations of melt-forming compounds or melt-formers can also be useful if desired. The term "melt-forming compound" or "melt former" as employed herein is intended to mean a compound which upon heating to the described processing temperature provides an improved reaction medium, typically a molten medium, wherein the described reaction combination can provide a better image. The exact nature of the reaction medium at processing temperatures described is not fully understood; however, it is believed that at reaction temperatures a melt occurs which permits the reaction components to better interact. Useful melt-forming compounds are typically separate components from the reaction combination, although the reaction combination can enter into the melt formation. Typically useful melt-forming compounds are amides, imides, cyclic ureas and triazoles which are compatible with other of the components of the materials of the invention. Useful melt-forming compounds or melt formers are described, for example, in Research Disclosure, Vol. 150, October 1976, Item 15049 of LaRossa and Boettcher, published by Industrial Opportunities Ltd., Homewell, Havant, Hampshire, PO9 1EF, UK. As described, the antihalation or filter layers of the invention can comprise a melt-forming compound if desired. A preferred melt-former is salicylanilide and similar compounds. Examples of thermal solvents, for example, salicylanilide, phthalimide, N-hydroxyphthalimide, N-potassium-phthalimide, succinimide, N-hydroxy-1,8-naphthalimide, phthalazine, 1-(2H)-phthalazinone, 2-acetylphthalazinone, benzanilide, and benzenesulfonamide. Prior-art thermal solvents are disclosed, for example, in U.S. Pat. No. 6,013,420 to Windender. Examples of toning agents and toning agent combinations are described in, for example, Research Disclosure, June 1978, Item No. 17029 and U.S. Pat. No. 4,123,282.

A range of concentration of melt-forming compound or melt-forming compound combination is useful in the heat developable photographic materials described. The optimum concentration of melt-forming compound will depend upon such factors as the particular imaging material, desired image, processing conditions and the like.

The photothermographic elements according to the invention can contain an image toner or toning agent in order to provide a more neutral or black tone image upon processing. The optimum image toner or toning agent will depend upon such factors as the particular imaging material, the desired image, particular processing conditions and the like. In some cases certain image toning agents or toners provide much better results with certain imaging materials than with others. Combinations of toning agents or toners can be useful if desired. The optimum concentration of toning agent or toning agent combination will depend upon such factors as the particular imaging material, processing conditions, desired image and the like.

Post-processing image stabilizers and latent image keeping stabilizers are useful in the photothermographic element. Any of the stabilizers known in the photothermographic art are useful for the described photothermographic element. Illustrative examples of useful stabilizers include photolytically active stabilizers and stabilizer precursors as described in, for example, U.S. Pat. 4,459,350. Other examples of useful stabilizers include azole thioethers and blocked azolinethione stabilizer precursors and carbamoyl stabilizer precursors, such as described in U.S. Pat. No. 3,877,940.

Photothermographic elements as described can contain addenda that are known to aid in formation of a useful image. The photothermographic element can contain development modifiers that function as speed increasing compounds, sensitizing dyes, hardeners, antistatic agents, plasticizers and lubricants, coating aids, brighteners, absorbing and filter dyes, such as described in Research Disclosure, December 1978, Item No. 17643 and *Research Disclosure*, June 1978, Item No. 17029.

The layers of the photothermographic element are coated on a support by coating procedures known in the photographic art, including dip coating, air knife coating, curtain coating or extrusion coating using hoppers. If desired, two or more layers are coated simultaneously.

A photothermographic element as described preferably comprises a thermal stabilizer to help stabilize the photothermographic element prior to exposure and processing. Such a thermal stabilizer provides improved stability of the photothermographic element during storage. Preferred thermal stabilizers are 2-bromo-2-arylsulfonylacetamides, such as 2-bromo-2-p-tolysulfonylacetamide;

2-(tribromomethyl sulfonyl)benzothiazole; and 6-substituted-2,4-bis(tribromomethyl)-s-triazines, such as 6-methyl or 6-phenyl-2,4-bis(tribromomethyl)-s-triazine.

Photographic elements of the present invention are preferably imagewise exposed using any of the known techniques, including those described in *Research Disclosure* I, Section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like). The photothermographic elements are also exposed by means of various forms of energy, including ultraviolet and infrared regions of the electromagnetic spectrum as well as electron beam and beta radiation, gamma ray, x-ray, alpha particle, neutron radiation and other forms of corpuscular wave-like radiant energy in either non-coherent (random phase) or coherent (in phase) forms produced by lasers. Exposures are monochromatic, orthochromatic, or panchromatic depending upon the spectral sensitization of the photographic silver halide. Imagewise exposure is preferably for a time and intensity sufficient to produce a developable latent image in the photothermographic element.

Once yellow, magenta, and cyan dye image records have been formed in the processed photographic elements of the invention, conventional techniques can be employed for retrieving the image information for each color record and manipulating the record for subsequent creation of a color balanced viewable image. For example, it is possible to scan the photographic element successively within the blue, green, and red regions of the spectrum or to incorporate blue, green, and red light within a single scanning beam that is divided and passed through blue, green, and red filters to form separate scanning beams for each color record. A simple technique is to scan the photographic element point-by-point along a series of laterally offset parallel scan paths. The intensity of light passing through the element at a scanning point is noted by a sensor which converts radiation received into an electrical signal. Most generally this electronic signal is further manipulated to form a useful electronic record of the image. For example, the electrical signal can be passed through an analog-to-digital converter and sent to a digital computer together with location information required for pixel (point) location within the image. In another embodiment, this electronic signal is encoded with colorimetric or tonal information to form an electronic record that is suitable to allow reconstruction of the image into viewable forms such as computer monitor displayed images, television images, printed images, and so forth.

In one embodiment, a photothermographic elements can be scanned prior to any removal of silver halide from the element. The remaining silver halide yields a turbid coating, and it is found that improved scanned image quality for such a system can be obtained by the use of scanners that employ diffuse illumination optics. Any technique known in the art for producing diffuse illumination can be used. Preferred systems include reflective systems, that employ a diffusing cavity whose interior walls are specifically designed to produce a high degree of diffuse reflection, and transmissive systems, where diffusion of a beam of specular light is accomplished by the use of an optical element placed in the beam that serves to scatter light. Such elements can be either glass or plastic that either incorporate a component that produces the desired scattering, or have been given a surface treatment to promote the desired scattering.

In view of advances in the art of scanning technologies, it has now become natural and practical for photothermographic color films such as disclosed in EP 0762 201 to be scanned, which can be accomplished without the necessity of removing the silver or silver-halide from the negative, although special arrangements for such scanning can be made to improve its quality. See, for example, Simmons U.S. Pat. No. 5,391,443. Method for the scanning of such films are also disclosed in commonly assigned U.S. Pat. No. 60/211,364 (docket 81246) and U.S. Pat. No. 60/211,061 (docket 81247), hereby incorporated by reference in their entirety.

For example, it is possible to scan the photographic element successively within the blue, green, and red regions of the spectrum or to incorporate blue, green, and red light within a single scanning beam that is divided and passed through blue, green, and red filters to form separate scanning beams for each color record. If other colors are imagewise present in the element, then appropriately colored light beams are employed. A simple technique is to scan the photographic element point-by-point along a series of laterally offset parallel scan paths. A sensor that converts radiation received into an electrical signal notes the intensity of light passing through the element at a scanning point. Most generally this electronic signal is further manipulated to form a useful electronic record of the image. For example, the electrical signal can be passed through an analog-to-digital converter and sent to a digital computer together with location information required for pixel (point) location within the image. The number of pixels collected in this manner can be varied as dictated by the desired image quality.

The electronic signal can form an electronic record that is suitable to allow reconstruction of the image into viewable forms such as computer monitor displayed images, television images, optically, mechanically or digitally printed images and displays and so forth all as known in the art. The formed image can be stored or transmitted to enable further manipulation or viewing, such as in U.S. Pat. No. 09/592,816 (Docket 81040) titled AN IMAGE PROCESSING AND MANIPULATION SYSTEM to Richard P. Szajewski, Alan Sowinski and John Buhr.

Illustrative systems of scan signal manipulation, including techniques for maximizing the quality of image records, are disclosed by Bayer U.S. Pat. No. 4,553,156; Urabe et al U.S. Pat. No. 4,591,923; Sasaki et al U.S. Pat. No. 4,631,578; Alkofer U.S. Pat. No. 4,654,722; Yamada et al U.S. Pat. No. 4,670,793; Klees U.S. Pat. Nos. 4,694,342 and 4,962,542; Powell U.S. Pat. No. 4,805,031; Mayne et al U.S. Pat. No. 4,829,370; Abdulwahab U.S. Pat. No. 4,839,721; Matsunawa et al U.S. Pat. Nos. 4,841,361 and 4,937,662; Mizukoshi et al U.S. Pat. No. 4,891,713; Petilli U.S. Pat. No. 4,912,569; Sullivan et al U.S. Pat. Nos. 4,920,501 and 5,070,413; Kimoto et al U.S. Pat. No. 4,929,979; Hirosawa et al U.S. Pat. No. 4,972,256; Kaplan U.S. Pat. No. 4,977,521; Sakai U.S. Pat. No. 4,979,027; Ng U.S. Pat. No. 5,003,494; Katayama et al U.S. Pat. No. 5,008,950; Kimura et al U.S. Pat. No. 5,065,255; Osamu et al U.S. Pat. No. 5,051,842; Lee et al U.S. Pat. No. 5,012,333; Bowers et al U.S. Pat. No. 5,107,346; Telle U.S. Pat. No. 5,105,266; MacDonald et al U.S. Pat. No. 5,105,469; and Kwon et al U.S. Pat. No. 5,081,692. Techniques for color balance adjustments during scanning are disclosed by Moore et al U.S. Pat. No. 5,049,984 and Davis U.S. Pat. No. 5,541,645.

The digital color records once acquired are in most instances adjusted to produce a pleasingly color balanced image for viewing and to preserve the color fidelity of the image bearing signals through various transformations or renderings for outputting, either on a video monitor or when printed as a conventional color print. Preferred techniques for transforming image bearing signals after scanning are disclosed by Giorgianni et al U.S. Pat. No. 5,267,030, the disclosures of which are herein incorporated by reference. Further illustrations of the capability of those skilled in the art to manage color digital image information are provided by Giorgianni and Madden *Digital Color Management*, Addison-Wesley, 1998.

For illustrative purposes, a non-exhaustive list of photothermographic film processes involving a common dry heat development step are as follows:

1. heat development=>scan=>stabilize (for example, with a laminate)=>scan=>obtain returnable archival film.
2. heat development=>fix bath=>water wash=>dry=>scan=>obtain returnable archival film
3. heat development=>scan=>blix bath=>dry=>scan=>recycle all or part of the silver in film
4. heat development=>bleach laminate=>fix laminate=>scan=>(recycle all or part of the silver in film)
5. heat development=>bleach=>wash=>fix=>wash=>dry=>relatively slow, high quality scan The following examples are presented to illustrate the practice of this invention, but are not meant to limit it in any way. All percentages are by weight unless otherwise indicated.

PHOTOGRAPHIC EXAMPLES

The following examples demonstrate the principles of the invention by preparing photographically useful compositions and testing them in relevant coated formats. In the descriptions that follow, HABI will be used to represent the hexarylbiimidazole bleach precursor compounds useful in the practice of the current invention.

Example 1

The following materials were prepared for the coatings that follow.

Solid Particle Dye SPD1:

A dispersion of aqueous insoluble dye D-1 was prepared by the method of ball milling. To a total 10 g sample was added 0.25 g dye D-1, 0.15 g polyvinyl pyrrolidone, 9.6 g distilled water, and 10 mL of zirconia beads. The slurry was ball milled for 48 hours. Following milling, the zirconia beads were removed by filtration. The slurry was refrigerated prior to use. The structure of D-1 is as follows:

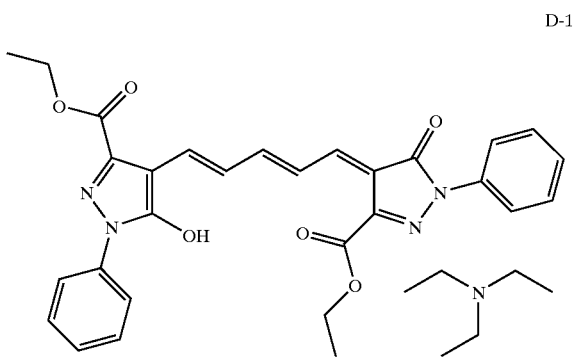

D-1

Solid Particle Bleach Precursor SPBP1:

A dispersion of aqueous insoluble bleach precursor H-1 was prepared by the method of ball milling. To a total 10 g sample was added 0.50 gm HABI H-1, 0.15 g polyvinyl pyrrolidone, 9.35 g distilled water, and 10 mL of zirconia beads. The slurry was ball milled for 48 hours. Following milling, the zirconia beads were removed by filtration. The slurry was refrigerated prior to use.

Aqueous Soluble Dye D-2:

The structure of aqueous soluble dye D-2 is as follows:

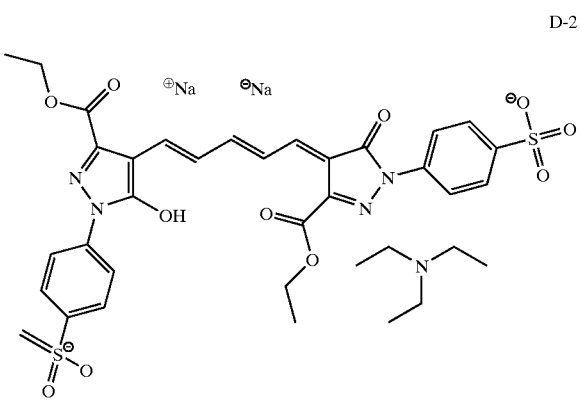

D-2

Coating Examples:

The coating examples were prepared according to the format listed below in Table 1-1, with variations consisting of changing the binder, coating solvent, and dye. All coatings were prepared on a 7 mil thick polyethylene terephthalate support.

TABLE 1-1

| Component | Laydown |
| --- | --- |
| Dye | 0.11 g/m² |
| Bleach precursor | 0.46 g/m² |
| Binder | 1.61 g/m² |

The coating variations, including the components for the coatings, are listed below in Table 1-2.

TABLE 1-2

| Coating | Binder | Solvent | Dye source | HABI source |
| --- | --- | --- | --- | --- |
| 1-1 | Gelatin | water | SPD1 | SPBP1 |
| 1-2 | Gelatin | water | D-2 | SPBP1 |

Processing of Coated Samples:

The coatings were thermally processed by contact with a heated platen for 10 seconds at a variety of temperatures. The coating red density was measured using a Status M filter set. The results are shown in the following Table 1-3.

TABLE 1-3

| Coating | Type | Process | Red density | Bleach ratio |
| --- | --- | --- | --- | --- |
| 1-1 | invention | None | 1.20 | 0.0 |
| | | 10"/90° C. | 1.38 | −0.15 |
| | | 10"/110° C. | 1.22 | −0.02 |
| | | 10"/150° C. | 1.02 | 0.15 |
| 1-2 | invention | none | 1.27 | 0.0 |
| | | 10"/90° C. | 1.29 | −0.02 |
| | | 10"/110° C. | 1.24 | 0.02 |
| | | 10"/150° C. | 1.05 | 0.17 |

The results from the processing of the coatings show that coatings utilizing solid particle bleach precursor bleached the dye at the highest temperature, and improved formulations will be demonstrated in the examples that follow. Some of the lower temperature thermal processing produced density increases. This was likely due to particles of dye being smeared through the coating by thermal forces, producing a slightly higher covering power and increased absorption.

Example 2

The following materials were prepared for the coatings that follow.

Oil Bleach Precursor Dispersion OBP1:

An oil dispersion of bleach precursor H-2 was prepared. To 0.90 g of 1,2-Benzenedicarboxylic acid, dibutyl ester was dissolved 0.45 g HABI compound H-2. An aqueous phase was prepared by dissolving 0.60 g polyvinyl alcohol into 1.5 g of a 10% Alkanol XC solution and 11.55 g distilled water. The two component phases were then mixed together with high shear in a colloid mill.

Solid Particle Dye SPD2:

A dispersion of aqueous insoluble dye D-3 was prepared by the method of ball milling. To a total 20 g sample was added 0.40 gm dye D-3, 0.20 g polyvinyl pyrrolidone, 19.4 g distilled water, and 20 mL of zirconia beads. The slurry was ball milled for 48 hours. Following milling, the zirconia beads were removed by filtration. The slurry was refrigerated prior to use.

Solid Particle Dye SPD3:

A dispersion of aqueous insoluble dye D-1 was prepared by the method of ball milling. To a total 20 g sample was added 0.40 gm dye D-1, 0.20 g polyvinyl pyrrolidone, 19.4 g distilled water, and 20 mL of zirconia beads. The slurry was ball milled for 48 hours. Following milling, the zirconia beads were removed by filtration. The slurry was refrigerated prior to use.

Solid Particle Bleach Precursor SPBP2:

A dispersion of aqueous insoluble bleach precursor H-1 was prepared by the method of ball milling. To a total 20 g sample was added 0.40 gm HABI H-1, 0.20 g polyvinyl pyrrolidone, 19.4 g distilled water, and 20 mL of zirconia beads. The slurry was ball milled for 48 hours. Following milling, the zirconia beads were removed by filtration. The slurry was refrigerated prior to use.

Dye Compounds:

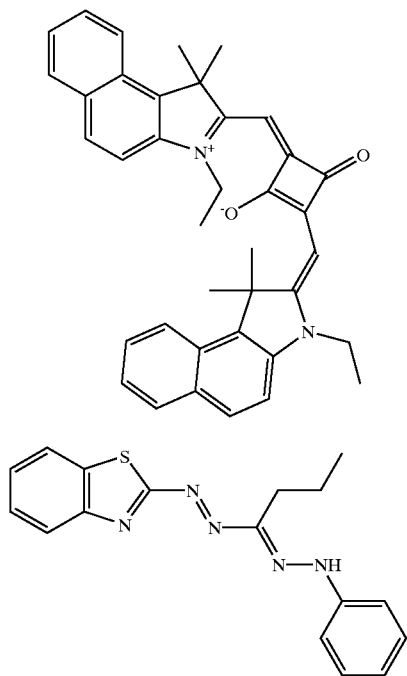

D-3

D-4

Coating Examples:

The coating examples were prepared according to the formats listed below in Table 2-1, with variations consisting of changing the binder, bleach precursor, and dye. All coatings were prepared on a 7 mil thick polyethylene terephthalate support.

TABLE 2-1

| Component | Format A | Format B |
| --- | --- | --- |
| Dye | 0.11 g/m$^2$ | 0.11 g/m$^2$ |
| bleach precursor | 1.08 g/m$^2$ | 0.46 g/m$^2$ |
| bleach precursor dispersion | oil dispersion | solid particle |
| Binder type | polyvinyl alcohol | polyvinyl alcohol |
| Binder level | 2.15 g/m$^2$ | 1.61 g/m$^2$ |
| melt former | 1.08 g/m$^2$ | 1.08 g/m$^2$ |

The coatings encompassed two bleach precursors incorporated into the coating by two methods. The PVA binder used water as the solvent. The components for the coatings are listed below in Table 2-2.

TABLE 2-2

| Coating | Format | Dye source | HABI source | Melt former |
| --- | --- | --- | --- | --- |
| 2-1 | A | SPD2 | OBP1 | Salicylanilide |
| 2-2 | B | SPD3 | SPBP2 | 1,3-dimethyl urea |

Processing of Coated Samples:

The coatings were thermally processed by contact with a heated platen for 10 seconds at a variety of temperatures. The coating density was measured using a Status M filter that was the additive complement to the subtractive primary of the particular dye. The results are shown in the following Table 2-3.

TABLE 2-3

| Coating | Type | Process | Filter | Density | Bleach Ratio |
| --- | --- | --- | --- | --- | --- |
| 2-1 | invention | None | red | 0.52 | 0.0 |
| | | 10"/120° C. | | 0.44 | 0.15 |
| | | 10"/140° C. | | 0.27 | 0.49 |
| | | 10"/160° C. | | 0.23 | 0.56 |
| | | 10"/180° C. | | 0.29 | 0.44 |
| 2-2 | invention | none | red | 0.84 | 0.0 |
| | | 10"/120° C. | | 0.73 | 0.13 |
| | | 10"/140° C. | | 0.57 | 0.32 |
| | | 10"/160° C. | | 0.33 | 0.61 |
| | | 10"/180° C. | | 0.34 | 0.60 |

The results from the processing of the coatings show that good bleaching was obtained with preparations that used oil and solid particle dispersions of bleach precursor and utilized polyvinyl alcohol as the binder. Example 3

The following materials were prepared for the coatings that follow.

Solid Particle Dye SPD4:

A dispersion of aqueous insoluble dye D-3 was prepared by the method of ball milling. To a total 20 g sample was added 0.50 gm dye D-3, 0.15 g polyvinyl pyrrolidone, 19.35 g distilled water, and 20 mL of zirconia beads. The slurry was ball milled for 48 hours. Following milling, the zirconia beads were removed by filtration. The slurry was refrigerated prior to use.

Solid Particle Dye SPD5:

A dispersion of aqueous insoluble dye D-4 was prepared by the method of ball milling. To a total 20 g sample was added 0.50 gm dye D-4, 0.15 g polyvinyl pyrrolidone, 19.35 g distilled water, and 20 mL of zirconia beads. The slurry was ball milled for 48 hours. Following milling, the zirconia beads were removed by filtration. The slurry was refrigerated prior to use.

Solid Particle Dye SPD6:

A dispersion of aqueous insoluble dye D-1 was prepared by the method of ball milling. To a total 20 g sample was added 0.50 gm dye D-1, 0.15 g polyvinyl pyrrolidone, 19.35 g distilled water, and 20 mL of zirconia beads. The slurry was ball milled for 48 hours. Following milling, the zirconia beads were removed by filtration. The slurry was refrigerated prior to use.

Solid Particle Bleach Precursor SPBP3:

A dispersion of aqueous insoluble bleach precursor H-2 was prepared by the method of ball milling. To a total 20 g sample was added 0.50 gm HABI H-2, 0.15 g polyvinyl pyrrolidone, 19.35 g distilled water, and 20 mL of zirconia beads. The slurry was ball milled for 48 hours. Following milling, the zirconia beads were removed by filtration. The slurry was refrigerated prior to use.

Solid Particle Bleach Precursor SPBP4:

A dispersion of aqueous insoluble bleach precursor H-1 was prepared by the method of ball milling. To a total 20 g sample was added 0.50 gm HABI H-2, 0.15 g polyvinyl pyrrolidone, 19.35 g distilled water, and 20 mL of zirconia beads.

The slurry was ball milled for 48 hours. Following milling, the zirconia beads were removed by filtration. The slurry was refrigerated prior to use.

Solid Particle Melt Former SPMF1:

A dispersion of salicylanilide was prepared by the method of ball milling. To a total 20 g sample was added 3.0 gm salicylanilide solid, 0.20 g polyvinyl pyrrolidone, 0.20 g Triton X 200 surfactant, 1.0 g gelatin, 15.6 g distilled water, and 20 mL of zirconia beads. The slurry was ball milled for 48 hours. Following milling, the zirconia beads were removed by filtration. The slurry was refrigerated prior to use.

Coating Examples:

The coating examples were prepared according to the format listed below in Table 3-1, with variations consisting of changing the bleach precursor and dye. All coatings were prepared on a 7 mil thick polyethylene terephthalate support.

TABLE 3-1

| Component | Laydown |
| --- | --- |
| Dye | 0.11 g/m² |
| Bleach precursor | 1.07 g/m² |
| Salicylanilide SPMF1 | 1.07 g/m² |
| Polyvinyl alcohol binder | 2.15 g/m² |

The coatings encompassed three dyes and two bleach precursors. All coatings used PVA as the binder and water as the solvent. The components for the coatings are listed below in Table 3-2.

TABLE 3-2

| Coating | Dye Source | HABI Source |
| --- | --- | --- |
| 3-1 | SPD4 | SPBP3 |
| 3-2 | SPD4 | SPBP4 |
| 3-3 | SPD5 | SPBP3 |
| 3-4 | SPD5 | SPBP4 |
| 3-5 | SPD6 | SPBP3 |
| 3-6 | SPD6 | SPBP4 |

Fresh Processing of Coated Samples:

The coatings were thermally processed by contact with a heated platen for 10 seconds at a variety of temperatures. The coating density was measured using a Status M filter that was the additive complement to the subtractive primary of the particular dye. The results for the fresh samples are shown in the following Table 3-3.

TABLE 3-3

| Coating | Type | Process | Filter | Density | Bleach Ratio |
| --- | --- | --- | --- | --- | --- |
| 3-1 | invention | none | Red | 0.74 | 0.0 |
| | | 10"/120° C. | | 0.76 | −0.02 |
| | | 10"/140° C. | | 0.11 | 0.85 |
| 3-2 | invention | none | Red | 0.65 | 0.0 |
| | | 10"/120° C. | | 0.41 | 0.37 |
| | | 10"/140° C. | | 0.18 | 0.72 |
| 3-3 | invention | none | blue | 0.30 | 0.0 |
| | | 10"/120° C. | | 0.10 | 0.67 |
| | | 10"/140° C. | | 0.07 | 0.77 |

TABLE 3-3-continued

| Coating | Type | Process | Filter | Density | Bleach Ratio |
| --- | --- | --- | --- | --- | --- |
| 3-4 | invention | none | blue | 0.26 | 0.0 |
| | | 10"/120° C. | | 0.09 | 0.65 |
| | | 10"/140° C. | | 0.05 | 0.81 |
| 3-5 | invention | none | red | 0.86 | 0.0 |
| | | 10"/120° C. | | 0.19 | 0.78 |
| | | 10"/140° C. | | 0.08 | 0.91 |
| 3-6 | invention | none | red | 0.95 | 0.0 |
| | | 10"/120° C. | | 0.17 | 0.82 |
| | | 10"/140° C. | | 0.08 | 0.92 |

Incubation of Coated Samples:

The six coatings of this example were sealed into Mylar® plastic bags after equilibration to the controlled conditions of 25.5° C. and 50% relative humidity. The samples were then held for 1 week at a temperature of 48.9° C. The coatings were evaluated for density loss after the accelerated keeping conditions. The results for the incubated samples are shown in Table 3-4 below. The fresh coatings used below were different than the fresh coatings in the above table, so some variation in density is expected.

TABLE 3-4

| Coating | Type | Condition | Filter | Density |
| --- | --- | --- | --- | --- |
| 3-1 | Invention | fresh | red | 0.74 |
| | | 1 wk refrigerated | | 0.76 |
| | | 1 week ambient | | 0.75 |
| | | 1 week 48.9° C. | | 0.67 |
| 3-2 | invention | fresh | red | 0.57 |
| | | 1 wk refrigerated | | 0.51 |
| | | 1 week ambient | | 0.54 |
| | | 1 week 48.9° C. | | 0.46 |
| 3-3 | invention | fresh | blue | 0.31 |
| | | 1 wk refrigerated | | 0.31 |
| | | 1 week ambient | | 0.31 |
| | | 1 week 48.9° C. | | 0.22 |
| 3-4 | invention | fresh | blue | 0.27 |
| | | 1 wk refrigerated | | 0.25 |
| | | 1 week ambient | | 0.26 |
| | | 1 week 48.9° C. | | 0.12 |
| 3-5 | invention | fresh | red | 0.97 |
| | | 1 wk refrigerated | | 0.92 |
| | | 1 week ambient | | 0.98 |
| | | 1 week 48.9° C. | | 0.81 |
| 3-6 | invention | fresh | red | 0.77 |
| | | 1 wk refrigerated | | 0.74 |
| | | 1 week ambient | | 0.74 |
| | | 1 week 48.9° C. | | 0.39 |

The results from the processing of the coatings show that good bleaching was obtained with solid particle dispersions of dye and bleach precursor coated in an environment containing melt former and polyvinyl alcohol binder. All three dye classes worked well with both HABI bleach precursors. In addition, the coatings had the desirable property of not prematurely bleaching during incubation.

Example 4

The materials described in Example 3 above were used for the coatings that follow. In addition, the following example utilized gelatin that had received a treatment with hydrogen peroxide to oxidize components of the gelatin that could react with the thermally produced radicals from the HABI bleach precursor.

Coating Examples:

The coating examples were prepared according to the format listed in Table 4-1 below, with variations consisting of changing the bleach precursor and dye. All coatings were prepared on a 7 mil thick polyethylene terephthalate support.

TABLE 4-1

| Component | Laydown |
|---|---|
| Dye | 0.11 g/m² |
| Bleach precursor | 1.07 g/m² |
| Salicylanilide SPMF1 | 1.07 g/m² |
| Oxidized gelatin binder | 2.15 g/m² |

The coatings encompassed three dyes and two bleach precursors. All coatings used oxidized gelatin as the binder and water as the solvent. The components for the coatings are listed below in Table 4-2 below.

TABLE 4-2

| Coating | Dye Source | HABI Source |
|---|---|---|
| 4-1 | SPD4 | SPBP3 |
| 4-2 | SPD4 | SPBP4 |
| 4-3 | SPD5 | SPBP3 |
| 4-4 | SPD5 | SPBP4 |
| 4-5 | SPD6 | SPBP3 |
| 4-6 | SPD6 | SPBP4 |

Fresh Processing of Coated Samples:

The coatings were thermally processed by contact with a heated platen for 10 seconds at a variety of temperatures. The coating density was measured using a Status M filter that was the additive complement to the subtractive primary of the particular dye. The results are shown in the following Table 4-3.

TABLE 4-3

| Coating | Type | Process | Filter | Density | Bleach Ratio |
|---|---|---|---|---|---|
| 4-1 | invention | None | red | 0.91 | 0.0 |
| | | 10"/120° C. | | 0.89 | 0.02 |
| | | 10"/140° C. | | 0.41 | 0.55 |
| | | 10"/160° C. | | 0.24 | 0.74 |
| | | 10"/180° C. | | 0.25 | 0.72 |
| 4-2 | invention | None | red | 1.04 | 0.0 |
| | | 10"/120° C. | | 1.04 | 0.0 |
| | | 10"/140° C. | | 0.80 | 0.23 |
| | | 10"/160° C. | | 0.87 | 0.16 |
| | | 10"/180° C. | | 0.75 | 0.29 |
| 4-3 | invention | None | blue | 0.48 | 0.0 |
| | | 10"/120° C. | | 0.17 | 0.65 |
| | | 10"/140° C. | | 0.08 | 0.83 |
| | | 10"/160° C. | | 0.07 | 0.85 |
| | | 10"/180° C. | | 0.08 | 0.83 |
| 4-4 | invention | none | blue | 0.46 | 0.0 |
| | | 10"/120° C. | | 0.31 | 0.33 |
| | | 10"/140° C. | | 0.18 | 0.61 |
| | | 10"/160° C. | | 0.14 | 0.70 |
| | | 10"/180° C. | | 0.17 | 0.63 |
| 4-5 | invention | none | red | 0.78 | 0.0 |
| | | 10"/120° C. | | 0.32 | 0.59 |
| | | 10"/140° C. | | 0.16 | 0.79 |
| | | 10"/160° C. | | 0.15 | 0.81 |
| | | 10"/180° C. | | 0.14 | 0.82 |
| 4-6 | invention | none | red | 0.87 | 0.0 |
| | | 10"/120° C. | | 0.53 | 0.39 |
| | | 10"/140° C. | | 0.42 | 0.52 |
| | | 10"/160° C. | | 0.43 | 0.51 |
| | | 10"/180° C. | | 0.40 | 0.54 |

Incubation of Coated Samples:

The six coatings of this example were sealed into Mylar® plastic bags after equilibration to the controlled conditions of 25.5° C. and 50% relative humidity.

The samples were then held for 2 weeks at a temperature of 48.9° C. The coatings were evaluated for density loss after the accelerated keeping conditions. The incubated results are shown in Table 4-4 below. The fresh coatings below were different than the fresh coatings in the above table, so some variation in density is expected.

TABLE 4-4

| Coating | Type | Condition | Filter | Density |
|---|---|---|---|---|
| 4-1 | invention | fresh | red | 0.91 |
| | | 2 wk refrigerated | | 0.98 |
| | | 2 week ambient | | 0.92 |
| | | 2 week 48.9° C. | | 0.90 |
| 4-2 | invention | fresh | red | 1.26 |
| | | 2 wk refrigerated | | 1.03 |
| | | 2 week ambient | | 1.08 |
| | | 2 week 48.9° C. | | 1.08 |
| 4-3 | invention | fresh | blue | 0.63 |
| | | 2 wk refrigerated | | 0.70 |
| | | 2 week ambient | | 0.77 |
| | | 2 week 48.9° C. | | 0.35 |
| 4-4 | invention | fresh | blue | 0.49 |
| | | 2 wk refrigerated | | 0.53 |
| | | 2 week ambient | | 0.43 |
| | | 2 week 48.9° C. | | 0.25 |
| 4-5 | invention | fresh | red | 0.82 |
| | | 2 wk refrigerated | | 0.85 |
| | | 2 week ambient | | 0.83 |
| | | 2 week 48.9° C. | | 0.78 |
| 4-6 | invention | fresh | red | 0.88 |
| | | 2 wk refrigerated | | 0.94 |
| | | 2 week ambient | | 0.90 |
| | | 2 week 48.9° C. | | 0.85 |

Processing of Incubated Samples:

The twelve high temperature and ambient temperature incubated coatings from the previous table were thermally processed for 10 seconds at 160° C. The ambient samples were from separate coatings while the high temperature samples were the same coatings used in the previous test. The results for the processing of incubated samples are shown in Table 4-5 below.

TABLE 4-5

| Coating | Incubation Condition | Filter | Start Density | Processed Density | Bleach Ratio |
|---|---|---|---|---|---|
| 4-1 | 2 week ambient | red | 0.97 | 0.26 | 0.73 |
| | 2 week 48.9° C. | | 0.86 | 0.25 | 0.71 |
| 4-2 | 2 week ambient | red | 0.86 | 0.64 | 0.25 |
| | 2 week 48.9° C. | | 1.06 | 0.75 | 0.29 |
| 4-3 | 2 week ambient | blue | 0.55 | 0.07 | 0.87 |
| | 2 week 48.9° C. | | 0.37 | 0.08 | 0.78 |
| 4-4 | 2 week ambient | blue | 0.31 | 0.11 | 0.65 |
| | 2 week 48.9° C. | | 0.26 | 0.15 | 0.42 |
| 4-5 | 2 week ambient | red | 0.86 | 0.16 | 0.81 |
| | 2 week 48.9° C. | | 0.79 | 0.10 | 0.87 |
| 4-6 | 2 week ambient | red | 0.91 | 0.42 | 0.54 |
| | 2 week 48.9° C. | | 0.87 | 0.52 | 0.39 |

The results from the processing of the coatings show that good bleaching was obtained with solid particle dispersions of dye and bleach precursor coated in an environment containing melt former and oxidized gelatin. All three dye classes worked well with both HABI bleach precursors. The coatings had the desirable property of not prematurely bleaching during incubation. In addition, the coatings showed the ability to bleach the dye density after the incubation period as well as when the coatings were fresh.

Example 5

This example demonstrates the use of an antihalation layer of the invention underneath a color photothermographic layer. The antihalation layer was formulated identical to Example 4-1 above. The photothermographic composition, described below, was coated both with and without this antihalation layer underneath. The following materials were utilized in the photothermographic layer.

Silver Salt Dispersion SS1:

A stirred reaction vessel was charged with 431 g of lime-processed gelatin and 6569 g of distilled water. A solution containing 214 g of benzotriazole, 2150 g of distilled water, and 790 g of 2.5 molar sodium hydroxide was prepared (Solution B). The mixture in the reaction vessel was adjusted to a pAg of 7.25 and a pH of 8.00 by additions of Solution B, nitric acid, and sodium hydroxide as needed.

A 4 1 solution of 0.54 molar silver nitrate was added to the kettle at 250 cc/minute, and the pAg was maintained at 7.25 by a simultaneous addition of solution B. This process was continued until the silver nitrate solution was exhausted, at which point the mixture was concentrated by ultrafiltration. The resulting silver salt dispersion contained fine particles of silver benzotriazole.

Silver Salt Dispersion SS2:

A stirred reaction vessel was charged with 431 g of lime processed gelatin and 6569 g of distilled water. A solution containing 320 g of 1-phenyl-5-mercaptotetrazole, 2044 g of distilled water, and 790 g of 2.5 molar sodium hydroxide was prepared (Solution B). The mixture in the reaction vessel was adjusted to a pAg of 7.25 and a pH of 8.00 by additions of Solution B, nitric acid, and sodium hydroxide as needed.

A 4 1 solution of 0.54 molar silver nitrate was added to the kettle at 250 cc/minute, and the pAg was maintained at 7.25 by a simultaneous addition of solution B. This process was continued until the silver nitrate solution was exhausted, at which point the mixture was concentrated by ultrafiltration. The resulting silver salt dispersion contained fine particles of the silver salt of 1phenyl-5-mercaptotetrazole.

Silver Halide Emulsion SH1:

The emulsion employed in these examples was a silver iodobromide tabular grain precipitated by conventional means as known in the art. The grain dimensions were 0.42 micrometer equivalent circular diameter by 0.06 micrometer thick. The emulsion was spectrally sensitized to blue light was given a chemical sensitization as known in the art to produce optimum sensitivity.

Coupler Dispersion CDM1:

A coupler dispersion was prepared by conventional means containing coupler M-1 (structure below) without any additional permanent solvents.

Incorporated Developer IC1:

Blocked developer DEV-1 (having the structure below) was ball-milled in an aqueous slurry for 3 days using Zirconia beads in the following formula. For 1 g of developer, 0.1 g of sodium tri-isopropylnaphthalene sulfonate, 10 g water, and 25 ml beads were. Following milling, the zirconia beads were removed by filtration. The slurry was refrigerated prior to use.

Structure

DEV-1

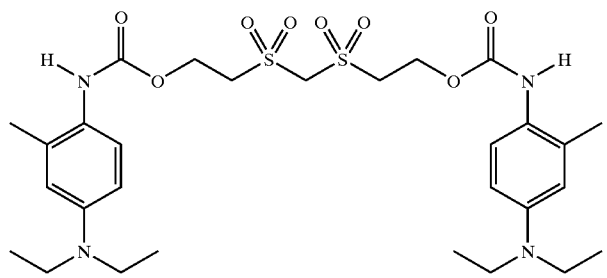

M-1

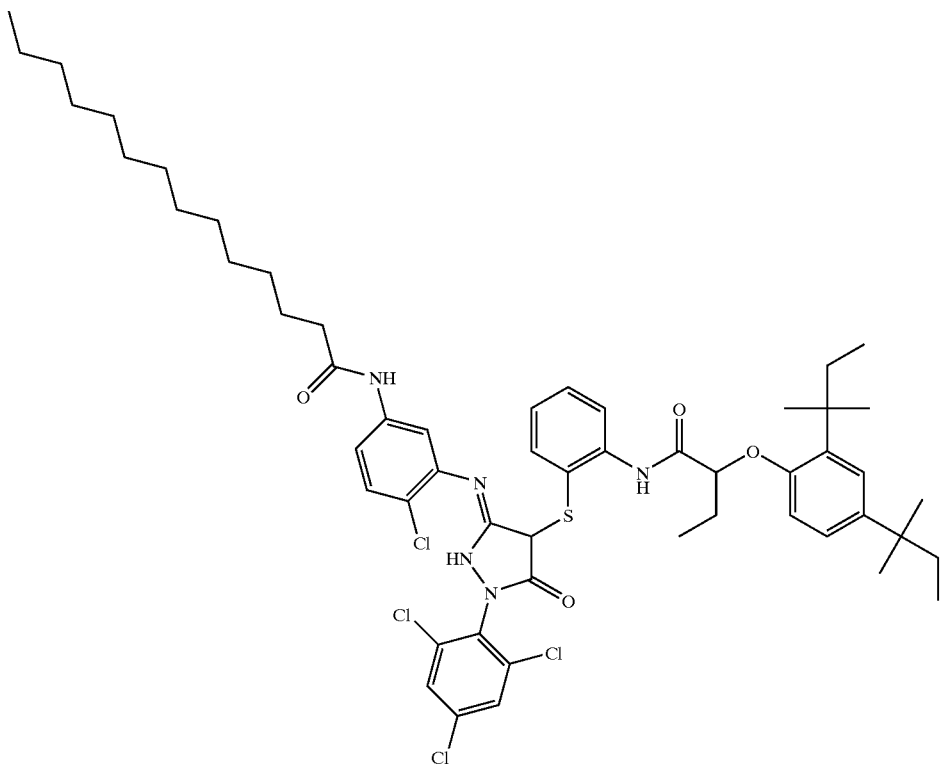

Coating Examples:

The photothermographic coating examples were prepared according to the formats listed below in Table 5-1. The first coating contained antihalation example 4-1 coated underneath while the second coating was coated without an antihalation layer. All coatings were prepared on a 7 mil thick polyethylene terephthalate support.

TABLE 5-1

| Component | Coating 5-1 | Coating 5-2 |
| --- | --- | --- |
| antihalation layer 4-1 underneath | no | yes |
| developer IC1 | 0.86 g/m² | 0.86 g/m² |
| salicylanilide SPMF1 | 0.86 g/m² | 0.86 g/m² |
| silver halide emulsion SH1 | 0.86 g/m² | 0.86 g/m² |
| silver salt SS1 | 0.32 g/m² | 0.32 g/m² |
| silver salt SS2 | 0.32 g/m² | 0.32 g/m² |
| coupler CDM1 | 0.54 g/m² | 0.54 g/m² |
| gelatin binder | 4.28 g/m² | 4.28 g/m² |

Processing of Coated Samples:

The resulting coatings were exposed through a step wedge to a 1.8 log lux light source at 5500K and a Wratten 2B filter. The exposure time was 0.1 seconds. After exposure, the coating was thermally processed by contact with a heated platen for 10 seconds at 160° C. Red, green, and blue densities were read using status M color profiles, to yield the densities listed in the table below. The antihalation dye was cyan in color, so the red density record was used to monitor the density of that layer. The imaging coupler within the photothermographic layer produced a magenta dye, so the green density record was used to monitor the density of that layer. It should be recognized that the photothermographic layer also produced neutral silver density, which would affect all three Status M density records. By the same token, the antihalation dye also exhibited non-zero absorbance in the green and blue filter regions. Measurements were performed on the raw-stock samples as well as on the processed samples at exposure steps resulting in the minimum (Dmin) and maximum (Dmax) density. The results are shown in the following Table 5-2.

TABLE 5-2

| Coating | Color Record | Thermal Process | Image Location | Density | Change From Raw Stock |
| --- | --- | --- | --- | --- | --- |
| 5-1 | red | none | — | 0.07 | 0.00 |
| | green | none | — | 0.08 | 0.00 |
| | blue | none | — | 0.16 | 0.00 |
| | red | 10"/160° C. | Dmin | 0.08 | 0.01 |
| | green | 10"/160° C. | Dmin | 0.13 | 0.05 |
| | blue | 10"/160° C. | Dmin | 0.16 | 0.00 |
| | red | 10"/160° C. | Dmax | 0.15 | 0.08 |
| | green | 10"/160° C. | Dmax | 0.46 | 0.38 |
| | blue | 10"/160° C. | Dmax | 0.24 | 0.08 |
| 5-2 | red | none | — | 1.36 | 0.00 |
| | green | none | — | 0.40 | 0.00 |
| | blue | none | — | 0.23 | 0.00 |
| | red | 10"/160° C. | Dmin | 0.93 | −0.43 |
| | green | 10"/160° C. | Dmin | 0.57 | 0.17 |
| | blue | 10"/160° C. | Dmin | 0.35 | 0.12 |
| | red | 10"/160° C. | Dmax | 1.05 | −0.31 |
| | green | 10"/160° C. | Dmax | 0.67 | 0.27 |
| | blue | 10"/160° C. | Dmax | 0.38 | 0.15 |

It is clear from the above results that the density produced by the photothermographic layer was reasonably unaffected by the chemistry contained in the antihalation layer. This is indicated by the increase in green and blue density for both of the processed coatings. In turn, the antihalation layer also bleached in the presence of the chemistry contained in the photothermographic layer. This is indicated by the large reduction in red density for the processed coating containing the antihalation layer. This shows that the composition of the invention is perfectly compatible for use with photothermographic elements.

The invention has been described in detail with particular reference to certain preferred embodiments thereof, but it will be understood that variations and modifications can be effected within the spirit and scope of the invention.

What is claimed is:

1. A photothermographic element comprising a support, at least one image-receiving photothermographic layer, and at least one antihalation layer or a filter layer, wherein the antihalation or filter layer comprises a heat-bleachable composition comprising the combination of at least one antihalation or filter dye and at least one hexaarylbiimidazole compound in the form of liquid or solid particles dispersed in the layer, said layer further comprising a polymeric matrix comprising, as the sole or primary binder material, a hydrophilic polymer or aqueous dispersible polymer.

2. The photographic element of claim 1 wherein the soluble hydrophilic polymer is selected from the group consisting of gelatin, poly(vinyl alcohol), poly(vinyl pyrrolidone), and poly(amides), or derivatives thereof.

3. The photographic element of claim 2 wherein the hydrophilic polymer is oxidized gelatin.

4. The photographic element of claim 1 wherein the layer comprises at least 5 percent water by weight.

5. The photothermographic element of claim 1 wherein the layer comprises 10 to 15 percent water by weight.

6. The photothermographic element of claim 1 wherein the particles have an average diameter of 0.01 to 5 microns.

7. The photothermographic element of claim 1 wherein the particles comprise a polymeric binder.

8. The photothermographic element of claim 1 wherein the dye is selected from the group consisting of oxonol, formazan, squaryllium dyes, or combinations thereof.

9. The photothennographic element of claim 8 wherein the dye is represented by the following structure:

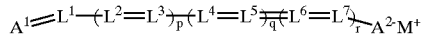

wherein $A^1$ and $A^2$ are ketomethylene or activated methylene moieties, $L^1$–$L^7$ each independently represent a substituted or unsubstituted methine group, $M^+$ is a cation, and p is one, q and r are independently 0 or 1.

10. The photothermographic element of claim 1 wherein the dye is represented by one of the following structures:

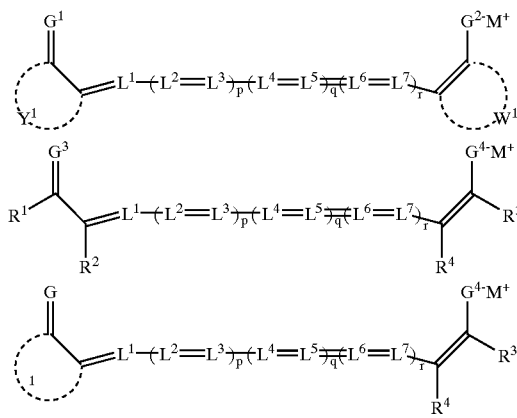

wherein $W^1$ and $Y^1$ are the atoms required to form a cyclic activated methylene/ketomethylene moiety; $R^1$ and $R^3$ are aromatic or heteroaromatic groups; $R^2$ and $R^4$ are electron-withdrawing groups; G–G4 are independently O or dicyanovinyl (—C(CN)$_2$)) and p is one, q and r are independently 0 or 1, and $L^1$–$L^7$ each represent a substituted or unsubstituted methine groups.

11. The photothermographic element of claim 9 wherein the activated methylene or ketomethylene moieties are independently selected from the group consisting of pyrazolinones, indanediones and thienonedioxide oxonols.

12. The photothermographic element of claim 1 wherein the dye is of the formula:

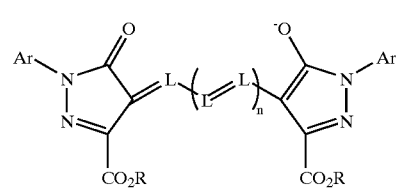

wherein n is 1 or 2 and each Ar is independently a substituted or unsubstituted aryl or heterocyclic group, and each R is independently a substituted or unsubstituted alkyl, aryl or alkenyl group and each L independently represents a substituted or unsubstituted methine group.

13. A photothermographic element as in claim 1 wherein said dye is a formazan dye represented by the formula:

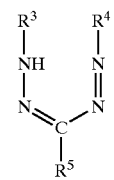

wherein $R^3$ is a substituted or unsubstituted aromatic group of 6 to 20 atoms in the ring system; $R^4$ is a substituted or unsubstituted aryl group having from 6 to 14 carbon atoms in the ring nucleus; $R^5$ is a substituted or unsubstituted alkyl group of 1 to 20 carbon atoms, a substituted or unsubstituted aryl group of 6 to 14 carbon atoms in the ring, or a substituted or unsubstituted 5- to 7-membered heterocyclic group having 5 to 7 atoms in the ring nucleus.

14. A photothermographic element as in claim 1 wherein said dye comprises a metallized formazan dye.

15. A photothermographic element as in claim 1 wherein said dye comprises a squaryllium dye represented by the following structure:

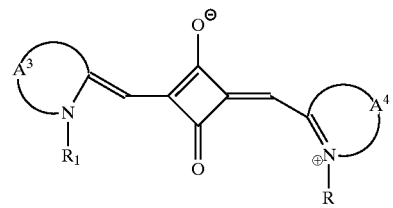

wherein $A^3$ and $A^4$ completes substituted or unsubstituted heterocyclic or fused heterocyclic rings, preferably 5 to 12-membered unsaturated rings, or $A^3$ or $A^4$ completes substituted or unsubstituted carbocyclic rings, preferably 5 to 12-membered unsaturated rings; and R and $R_1$ independently represents alkyl, substituted alkyl or aryl, preferably having 1–6 carbon atoms.

16. The photothermographic element according to claim 1, wherein the hexaarylbiimidazole comprises an oxidative triarylimidazole dimer of two compounds independently represented by the following structure:

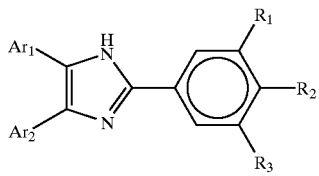

wherein $R_1$, $R_2$ and $R_3$ are independently substituents selected from the group consisting of hydrogen, halogen, cyano, carboalkoxy, nitro, substituted or unsubstituted alkyl of 1 to about 10 carbons, substituted or unsubstituted alkoxy of 1 to 10 carbon atoms, aryl or substituted aryl of from 5 to about 10 carbons, substituted or unsubstituted benzyl of from 6 to 11 carbon atoms; and wherein $Ar_1$ and $Ar2$ are independently substituted or unsubstituted carbocyclic or heterocyclic aromatic groups.

17. The photothermographic element according to claim 16, wherein the $R_1$, $R_2$ and $R_3$ are independently hydrogen, halogen, alkyl or substituted alkyl of 1 to about 10 carbons, aryl or substituted aryl of from 5 to about 10 carbons, or a substituted or unsubstituted benzyl of from 7 to 12 carbon atoms.

18. The photothermographic element of claim 16 wherein at least one hexaarylbiimidazole represented by structure I:

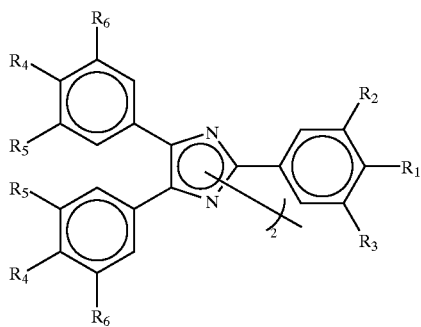

wherein $R_1$ is hydrogen or halogen; $R_2$, and $R_3$ are independently hydrogen, halogen, alkyl or substituted alkyl of 1 to about 10 carbons, aryl or substituted aryl of from 5 to about 10 carbons, a substituted or unsubstituted benzyl; $R_4$, $R_5$, and $R_6$ are independently hydrogen, alkyl or substituted alkyl of 1 to about 6 carbons.

19. The photothermographic element of claim 16 wherein $R_1$, $R_2$, and $R_3$ are hydrogen; $R_4$ is alkyl or substituted alkyl of 1 to about 6 carbons; and $R_5$ and $R_6$ are hydrogen.

20. The photothermographic element of claim 3 wherein at least one hexaarylbiimidazole is represented by the following structure:

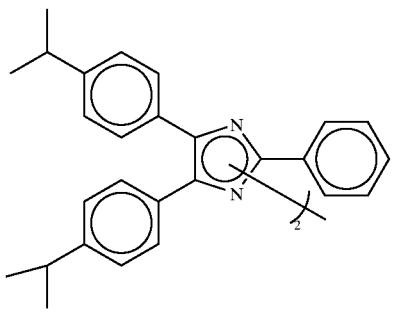

21. A photothermographic element as in claim 1 wherein the at least one antihalation or filter dye is capable of reacting with the hexaarylbiimidazole when the layer is heated, wherein said antihalation or filter layer becomes substantially colorless within 2 minutes upon heating to a temperature of at least 90° C.

22. In a photothermographic element comprising (a) a support, having thereon (b) at least one photothermographic layer comprising photosensitive silver halide, and (c) an antihalation layer, below the photothermographic layer, comprising (i) at least one hexaarylbiimidazole in the form of a dispersion of solid particles having an average size of 0.01 to 5 microns, and (ii) at least one antihalation dye, wherein said anihalation dye becomes at least about 50% colorless within about 5 minutes upon heating to a temperature of at least about 90° C.

23. The photothermographic element of claim 22, wherein the photothermographic layer further comprises a non-light-sensitive organic, silver salt oxidizing agent, further in combination with an incorporated developing agent.

24. A photothermographic element as in claim 22 wherein said antihalation layer (c) is between said support and said layer (b) comprising photosensitive silver halide.

25. A photothermographic element as in claim 22 wherein said antihalation layer (c) is on the side of said support opposite the side containing said layer (b) comprising photosensitive silver halide.

26. In a photothermographic element comprising (a) a support, having thereon (b) at least one photothermographic layer comprising photosensitive silver halide and (c) a filter layer, below the photothermographic layer, comprising (i) at least one hexaarylbiimidazole in the form of a dispersion of solid or liquid particles having an average size of 0.01 to 5 microns, and (ii) at least one filter dye, wherein said filter dye becomes at least about 50% colorless within about 5 minutes upon heating to a temperature of at least about 90° C.

27. The photothermographic element of claim 26, further comprising a non-light-sensitive organic, silver salt oxidizing agent, further in combination with an incorporated developing agent.

28. A photothermographic element as in claim 26 wherein said filter layer (c) is below a blue photosensitive layer.

29. A photothermographic element as in claim 26 wherein said filter layer (c) is below a green sensitive layer.

30. A photothermographic element as in claim 22 wherein the photothermographic color element comprising at least three light-sensitive units that have their individual sensitivities in different wavelength regions.

31. A method of making a photothermographic film for imagewise exposure in a camera, said film having at least three light-sensitive units which have their individual sensitivities in different wavelength regions, each of the units comprising at least one light-sensitive silver-halide emulsion, a binder, and dye-providing coupler, said method comprising coating a support with an aqueous dispersion comprising at least one antihalation or filter dye and at least one hexaarylbiimidazole compound, which aqueous dispersion comprises an aqueous phase and a dispersed organic phase, the aqueous phase comprising a soluble hydrophilic polymer or dispersed hydrophobic polymer, the dispersed organic phase comprising solid or liquid particles in which said hexaarylbiimidazole compound is present, wherein the hexaarylbiimidazole compound in said particles is capable of bleaching said dye when the dispersion is coated, dried and heated to a temperature of at least 90° C. for at least 0.5 seconds.

32. The method of claim 31, further comprising one or more organic silver salts.

33. A method of image formation comprising the step of developing an imagewise exposed photothermographic element according to claim 1.

34. A photothermographic method according to claim 33 that is capable of dry development without the application of aqueous solutions.

35. A method according to claim 33, wherein said developing comprises treating said imagewise exposed element at a temperature between about 80° C. and about 180° C. for a time ranging from about 0.5 to about 60 seconds.

36. A method according to claim 33 wherein image formation comprises the step of scanning an imagewise exposed and developed imaging element to form a first electronic image representation of said imagewise exposure.

37. A method according to claim 36 wherein the image formation comprises the step of digitizing a first electronic image representation formed from an imagewise exposed, developed, and scanned imaging element to form a digital image.

38. A method according to claim 36 wherein image formation comprising the step of modifying a first electronic image representation formed from and imagewise exposed, developed, and scanned imaging element formulated to form a second electronic image representation.

39. A method according to claim 36 comprising storing, transmitting, printing, or displaying and electronic image representation of an image derived from an imagewise exposed, developed, scanned imaging element.

40. A method according to claim 39, wherein printing the image is accomplished with any of the following printing technologies:

electrophotography; inkjet; thermal dye sublimation; or CRT or LED printing to sensitized photographic paper.

41. A method of processing color photographic film that has been imagewise exposed in a camera, said film having at least three light-sensitive units which have their individual sensitivities in different wavelength regions, each of the units comprising at least one light-sensitive silver-halide emulsion, one or more organic silver salts, a binder, and dye-providing coupler, said film further comprising an antihalation layer, below the photothermographic layer, comprising (i) at least one hexaarylbiimidazole in the form of a dispersion of solid particles having an average size of 0.01 to 5 microns, and (ii) at least one antihalation dye; which method in order comprises:

(a) thermally developing the film step without any externally applied developing agent, comprising heating said film to a temperature greater than 80° C. for at least 0.5 seconds in an essentially dry process, such that an internally located blocked developing agent in reactive association with each of said three light-sensitive units becomes unblocked to form a developing agent, whereby the unblocked developing agent forms dyes by reacting with the dye-providing couplers to form a color image; and wherein said antihalation dye becomes at least about 50% colorless;

(b) scanning the color image to provide a digital electronic record capable of generating a positive color image in a display element.

* * * * *